United States Patent
Yano et al.

(10) Patent No.: US 9,280,081 B2
(45) Date of Patent: Mar. 8, 2016

(54) IMAGE FORMING APPARATUS THAT SUPPRESSES OCCURRENCE OF COLOR SHIFT IN IMAGES AND METHOD OF CONTROLLING THE SAME

(71) Applicant: CANON KABUSHIKI KAISHA, Tokyo (JP)

(72) Inventors: Yuzuru Yano, Moriya (JP); Junya Takatsu, Yachiyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 14/107,065

(22) Filed: Dec. 16, 2013

(65) Prior Publication Data

US 2014/0168338 A1    Jun. 19, 2014

(30) Foreign Application Priority Data

Dec. 18, 2012  (JP) ................................. 2012-275680
Jul. 31, 2013   (JP) ................................. 2013-159385

(51) Int. Cl.
*G03G 15/043* (2006.01)
*G03G 15/01* (2006.01)

(52) U.S. Cl.
CPC .......... *G03G 15/043* (2013.01); *G03G 15/0189* (2013.01); *G03G 2215/0158* (2013.01)

(58) Field of Classification Search
CPC ..................... G03G 2215/0158; G03G 15/043
See application file for complete search history.

(56) References Cited

U.S. PATENT DOCUMENTS

| | | | |
|---|---|---|---|
| 5,381,167 A | 1/1995 | Fujii et al. | |
| 6,252,618 B1* | 6/2001 | Coriale et al. | 347/116 |
| 7,847,810 B2 | 12/2010 | Abe | |
| 2001/0046391 A1* | 11/2001 | Koide | 399/51 |

FOREIGN PATENT DOCUMENTS

| | | |
|---|---|---|
| CN | 101546152 A | 9/2009 |
| JP | 08-099437 A | 4/1996 |
| JP | 09329936 A | 12/1997 |
| JP | 2002-333752 A | 11/2002 |

OTHER PUBLICATIONS

Office Action issued in CN Application No. 201310683918.6 issued on Nov. 30, 2015. English translation provided.

* cited by examiner

*Primary Examiner* — Sandra Brase
(74) *Attorney, Agent, or Firm* — Rossi, Kimms & McDowell LLP

(57) ABSTRACT

An image forming apparatus that suppresses occurrence of color shift in images transferred from image bearing members onto an intermediate transfer member. A surface of each of a first photosensitive drum and second photosensitive drums is charged. An exposure device, provided for each photosensitive drum, forms an electrostatic latent image by exposing an associated one of the charged photosensitive drums. A developing device, provided for each photosensitive drum, develops the electrostatic latent image with toner. An intermediate transfer belt friction-drives the photosensitive drums for rotation and has the developed images transferred thereon. Timing for exposing the second photosensitive drums is controlled based on a first surface distance from an exposure light irradiated position to a primary transfer position of the first photosensitive drum, and a second surface distance from an exposure light irradiated position of each second photosensitive drum to a primary transfer position thereof.

13 Claims, 27 Drawing Sheets

FIG.21A

| PULSE NUMBER n | SURFACE DISTANCE zn [um] |
|---|---|
| 1 | 118.81 |
| 2 | 119.81 |
| 3 | 120.81 |
| 4 | 122.81 |
| 5 | 121.81 |
| ... | ... |
| 789 | 113.81 |
| 800 | 115.81 |

FIG.21B

| PULSE NUMBER n | RADIUS rn [um] |
|---|---|
| 1 | 15127.32 |
| 2 | 15254.65 |
| 3 | 15381.97 |
| 4 | 15636.62 |
| 5 | 15509.30 |
| ... | ... |
| 789 | 14490.70 |
| 800 | 14745.35 |

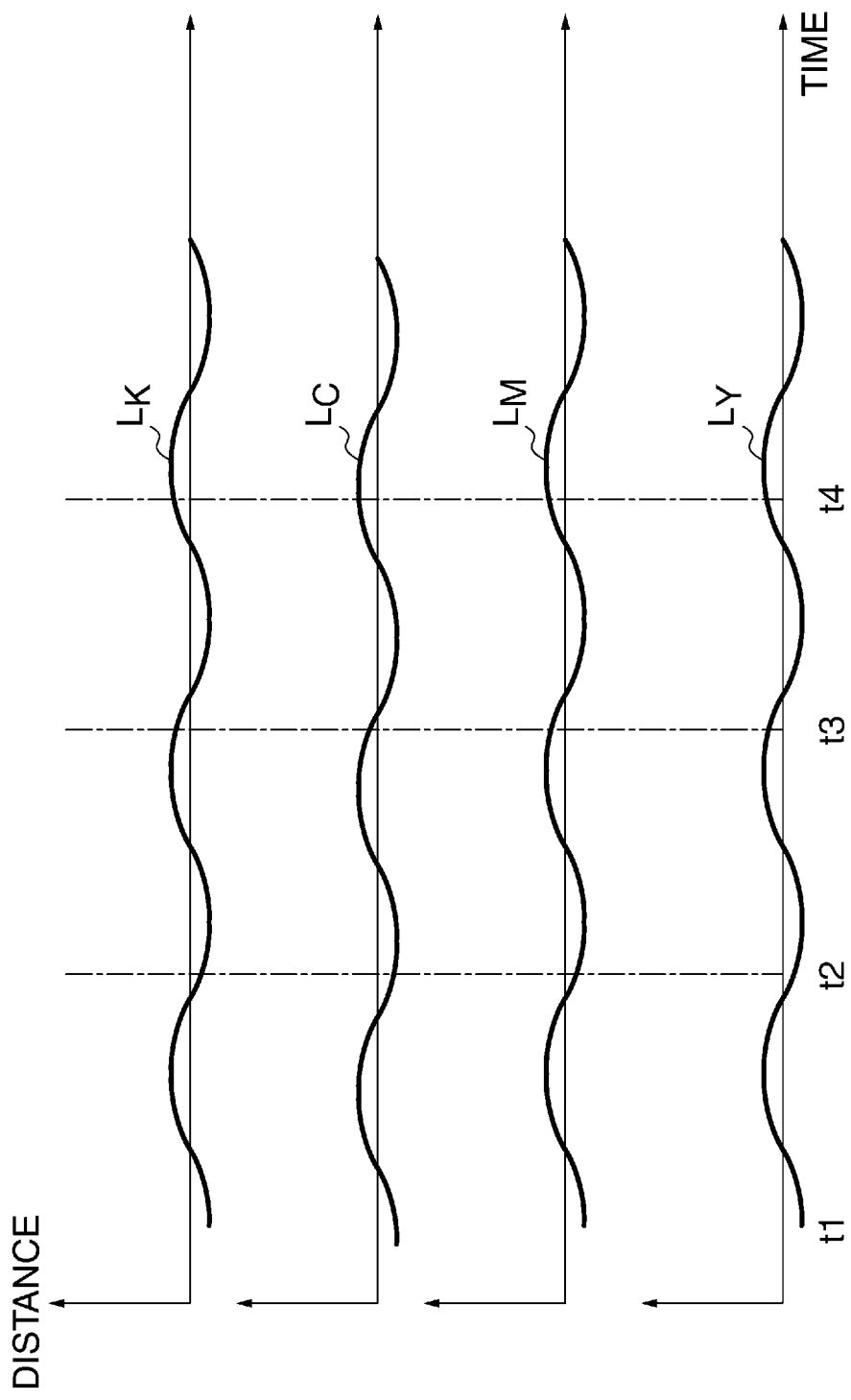

IMAGE FORMING APPARATUS THAT SUPPRESSES OCCURRENCE OF COLOR SHIFT IN IMAGES AND METHOD OF CONTROLLING THE SAME

BACKGROUND OF THE INVENTION

1. Field of the Invention

The present invention relates to an electrophotographic image forming apparatus that suppresses occurrence of color shift in images and a method of controlling the same.

2. Description of the Related Art

In a tandem-type electrophotographic image forming apparatus including photosensitive drums, transfer positions at which images are primarily transferred from the respective photosensitive drums onto an intermediate transfer member are different between the photosensitive drums. Therefore, if the timing of starting to form an electrostatic latent image on each photosensitive drum is not adjusted to be uniform between the colors, the transferred images formed on the intermediate transfer member are displaced between the colors, causing image color shift, which is positional displacement between images of respective colors formed on a recording sheet. To prevent this problem, it is necessary to cause positions of the images transferred onto the intermediate transfer member to be adjusted to be uniform by shifting the timing of starting to form an electrostatic latent image between the photosensitive drums by a time required for an image already transferred onto the intermediate transfer member to be conveyed from one photosensitive drum to the next one.

Further, the photosensitive drums and the intermediate transfer member are required to be driven at a constant surface speed.

This is because, first, in a case where time-synchronized exposure is employed as laser exposure for drawing an electrostatic latent image on the photosensitive drum, variation in the surface speed of the photosensitive drum causes deviation of a laser-irradiated position on the photosensitive drum from an original proper position to be irradiated.

Secondly, also in a primary transfer process for transferring a toner image formed on the photosensitive drum onto the intermediate transfer member, if there occurs an AC current-like variation in the difference of surface speed between the photosensitive drum and the intermediate transfer member, the position of the toner image which is to be transferred onto the intermediate transfer member deviates from the original proper position on which the toner image is to be transferred.

To overcome the above-mentioned problem, in the control of driving the photosensitive drum, the feedback-control of the speed of a motor as a drive source is performed, using various speed detection sensors and the like, whereby highly-accurate speed constancy is ensured. Further, as the motor, one employing a brushless DC motor (hereinafter referred to as the "BLDC motor") is often used because of low-cost, quietness, and high efficiency.

In recent years, for the speed feedback control using the BLDC motor, a method is sometimes employed in which a rotary encoder is arranged on a drum shaft, and the CPU controls the BLDC motor to rotate the drum shaft at a constant speed.

In the above-mentioned speed feedback control, the rotational speed of the drum shaft is detected, but it is difficult to control the surface speed of the photosensitive drum to a constant speed due to off-centering, a mounting error and the like of each of the photosensitive drum, the motor, and drive gears.

Similarly, in the intermediate transfer member as well, it is difficult to control the surface speed of the intermediate transfer member to a constant speed due to off-centering, a mounting error, and the like, of each of the motor and drive gears for driving the intermediate transfer member.

Further, causes of the image defects include mutual interference caused by friction between the surface of the photosensitive drum and the transfer surface of the intermediate transfer member. This is caused because a speed variation occurring in one of the photosensitive drum and the intermediate transfer member has influence on the other.

As another cause, there may be mentioned an occurrence of an unplanned change in load on the intermediate transfer member during secondary transfer of a toner image carried on the intermediate transfer member onto a recording sheet, especially when the recording sheet is thick paper. This causes a high-frequency speed variation, and this speed variation causes positional displacement in the primary transfer.

As described above, there are various causes of the image defects, and it is very difficult to eliminate all of the causes.

To cope with this, there has been proposed a transfer mechanism configured such that an image transfer roller which corresponds to the intermediate transfer member causes an image roller which corresponds to the photosensitive drum to be friction-driven (see e.g. Japanese Patent Laid-Open Publication No. 2002-333752). The technique of this transfer mechanism is characterized in that images on the photosensitive drums become an image on the intermediate transfer member, and hence by forming the image on the intermediate transfer member with reference to respective positions on the photosensitive drums, the influence of irregular rotation of the photosensitive drums is reduced. As to this technique, it is important to form an image with reference to the rotational position of each photosensitive drum, and hence there has been proposed a method of performing exposure control in synchronism with an amount of rotational movement of the drum (see e.g. Japanese Patent Laid-Open Publication No. H08-99437). According to this method, it is possible to form electrostatic latent images on the photosensitive drums without positional displacement even if there is a variation in the amount of rotational movement of each photosensitive drum.

Further, the technique disclosed in Japanese Patent Laid-Open Publication No. 2002-333752 is further characterized in that even when the speed of the intermediate transfer member is varied e.g. due to an impact generated upon entrance of a recording sheet into a secondary transfer section of the intermediate transfer member, coincidence of respective images on the photosensitive drums and an image on the intermediate transfer member can be ensured, and hence image defects are less liable to be caused by the primary transfer.

However, in the method of shifting the timing of starting to form an electrostatic latent image between the photosensitive drums by a time period required for an image already transferred onto the intermediate transfer member to be conveyed from one photosensitive drum to the next one, so as to prevent occurrence of image color shift, there arises a problem that a time period required for a latent image and its resulting image formed by development on each photosensitive drum, to advance from an exposure light irradiated position to a primary transfer position, and a time period required for a transferred image on the intermediate transfer member to be conveyed from one photosensitive drum to another are made different by an extent corresponding to variation in the respective speeds of the photosensitive drum and the intermediate transfer member.

SUMMARY OF THE INVENTION

The present invention provides an image forming apparatus that suppresses occurrence of color shift in images transferred from a plurality of image bearing members onto an intermediate transfer member, and a method of controlling the image forming apparatus.

In a first aspect of the present invention, there is provided an image forming apparatus comprising a first image bearing member and a second image bearing member, a surface of each of which is charged, an exposure unit provided for each of the first and second image bearing members and configured to form an electrostatic latent image by exposing each associated one of the first and second image bearing members, the surface of which has been charged, a developing unit provided for each of the first and second image bearing members and configured to develop the electrostatic latent image with color material, an intermediate transfer member configured to be brought into contact with the first and second image bearing members to friction-drive the first and second image bearing members for rotation, and have the color material transferred thereon, with which the electrostatic latent image on each of the first and second image bearing members has been developed by the developing unit, and a control unit configured to control timing for exposing the second image bearing member based on a first surface distance from a position on the first image bearing member where exposure is started by the exposure unit to a position where the first image bearing member is in contact with the intermediate transfer member, and a second surface distance at a time when the first image bearing member is exposed by the exposure unit, extending from a position on the second image bearing member, which is to be exposed by the exposure unit, to a position where the second image bearing member is in contact with the intermediate transfer member.

In a second aspect of the present invention, there is provided an image forming apparatus comprising a plurality of image bearing members, a surface of each of which is charged, an exposure unit provided for each of the plurality of image bearing members and configured to form an electrostatic latent image by exposing each associated one of the plurality of image bearing members, the surface of which has been charged, a developing unit provided for each of the plurality of image bearing members and configured to develop the electrostatic latent image with color material, an image bearing member rotary encoder provided for each of the plurality of image bearing members and configured to use a rotational shaft of an associated one of the image bearing members as an input shaft, an intermediate transfer member configured to be brought into contact with the plurality of image bearing members to friction-drive the image bearing members for rotation, and have the color material transferred thereon from each the image bearing member, with which the electrostatic latent image on each the image bearing member has been developed by the developing unit, an intermediate transfer member rotary encoder configured to use a rotational shaft of a rotating member that drives the intermediate transfer member, as an input shaft, a count unit configured to count pulses output from the image bearing member rotary encoder and the intermediate transfer member rotary encoder, and a control unit configured to control timing at which each the exposure unit exposes an associated one of the image bearing members, based on a first distance from a position where each the image bearing member is exposed by the exposure unit to a position where an image is transferred onto the intermediate transfer member, a second distance between a position where the image is transferred from one of the image bearing members as a reference image bearing member to the intermediate transfer member and a position where the image is transferred from each of the image bearing members other than the reference image bearing member to the intermediate transfer member, and the number of pulses counted by the count unit.

In a third aspect of the invention, there is provided a method of controlling an image forming apparatus comprising a first image bearing member and a second image bearing member, a surface of each of which is adapted to be charged, an exposure unit provided for each of the first and second image bearing members and configured to form an electrostatic latent image by exposing each associated one of the first and second image bearing members, the surface of which having been charged, a developing unit provided for each of the first and second image bearing members and configured to develop the electrostatic latent image with color material, and an intermediate transfer member configured to be brought into contact with the first and second image bearing members, and have the color material transferred thereon, with which the electrostatic latent image on each of the first and second image bearing members has been developed by the developing unit, the method comprising controlling timing for exposing the second image bearing member in dependence upon a first surface distance from a position on the first image bearing member where exposure is started by the exposure unit to a position where the first image bearing member is in contact with the intermediate transfer member, and a second surface distance at a time when the first image bearing member is exposed by the exposure unit, extending from a position on the second image bearing member, which is to be exposed by the exposure unit, to a position where the second image bearing member is in contact with the intermediate transfer member.

In a third aspect of the invention, there is provided a method of controlling an image forming apparatus comprising a plurality of image bearing members, a surface of each of which is charged, an exposure unit provided for each of the plurality of image bearing members and configured to form an electrostatic latent image by exposing each associated one of the plurality of image bearing members, the surface of which has been charged, a developing unit provided for each of the plurality of image bearing members and configured to develop the electrostatic latent image with color material, an image bearing member rotary encoder provided for each of the plurality of image bearing members and configured to use a rotational shaft of an associated one of the image bearing members as an input shaft, an intermediate transfer member configured to be brought into contact with the plurality of image bearing members to friction-drive the image bearing members for rotation, and have the color material transferred thereon from each the image bearing member, with which the electrostatic latent image on each the image bearing member has been developed by the developing unit, an intermediate transfer member rotary encoder configured to use a rotational shaft of a rotating member that drives the intermediate transfer member, as an input shaft, and a count unit configured to count pulses output from the image bearing member rotary encoder and the intermediate transfer member rotary encoder, the method comprising controlling timing at which each the exposure unit exposes an associated one of the image bearing members, in dependence upon a first distance from a position where each the image bearing member is exposed by the exposure unit to a position where an image is transferred onto the intermediate transfer member, a second distance between a position where the image is transferred from one of the image bearing members as a reference image bearing member to the intermediate transfer member and a position where the image is transferred from each of the image bearing members other than the reference image bearing member to the intermediate transfer member, and the number of pulses counted by the count unit.

According to the present invention, it is possible to provide an image forming apparatus that suppresses occurrence of color shift in images transferred from the plurality of image bearing members onto the intermediate transfer member and a method of controlling the image forming apparatus.

Further features of the present invention will become apparent from the following description of exemplary embodiments with reference to the attached drawings.

BRIEF DESCRIPTION OF THE DRAWINGS

FIG. 21A is a diagram showing a surface distance of the photosensitive drum, associated with an encoder pulse number, in a second embodiment of the present invention.

FIG. 21B is a diagram showing a radius of the photosensitive drum, associated with the encoder pulse number, in the second embodiment.

FIG. 22 is a diagram useful in explaining control for causing the start timing of exposure control to be adjusted to be uniform between the respective colors.

DESCRIPTION OF THE EMBODIMENTS

The present invention will now be described in detail below with reference to the accompanying drawings showing embodiments thereof.

Figure 1:
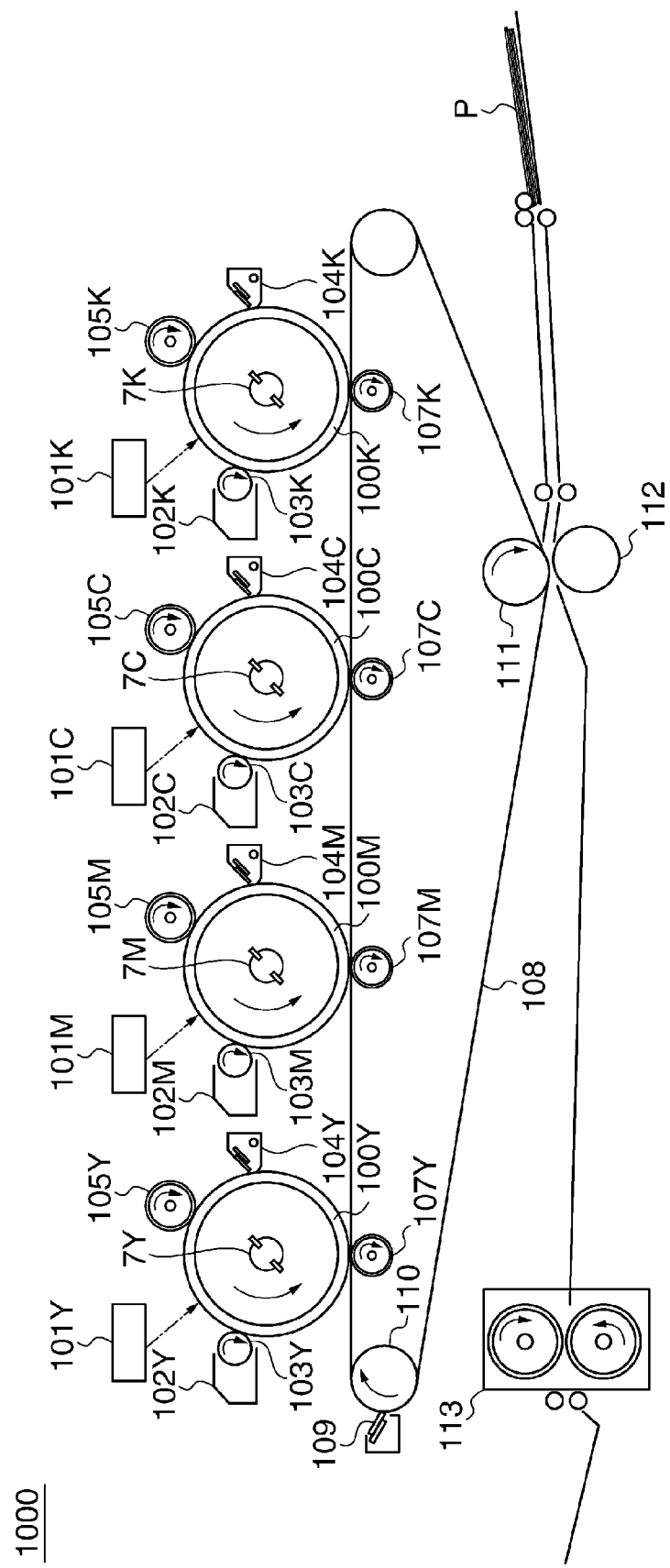
FIG. 1 is a schematic cross-sectional view of essential parts of an image forming apparatus according to a first embodiment of the present invention.

FIG. 1 is a schematic diagram of an image forming apparatus 1000 according to a first embodiment of the present invention.

Referring to FIG. 1, the image forming apparatus 1000 is capable of forming images of the four colors of yellow (hereinafter referred to as "Y"), magenta (hereinafter referred to as "M"), cyan (hereinafter referred to as "C"), and black (hereinafter referred to as "K"). In FIG. 1, although component elements for the respective colors of Y, M, C, and K are denoted by reference numerals including Y, M, C, and K, when the component elements are not specifically distinguished from each other, Y, M, C, and K are omitted.

When the image forming apparatus 1000 receives an instruction for forming an image on a recording sheet P from a host CPU, referred to hereinafter, there start to rotate a plurality of photosensitive drums 100 (image bearing members), an intermediate transfer member (intermediate transfer belt; abbreviated to "ITB" in the drawings) 108, electrostatic charging rollers 105 provided for the respective photosensitive drums 100, developing sleeves 103 provided for the respective photosensitive drums 100, primary transfer rollers 107 provided for the respective photosensitive drums 100, a secondary transfer backup roller 111, and a fixing device 113.

The electrostatic charging rollers 105 are each connected to a high-voltage power source, not shown, and have a high voltage applied thereto which is formed by DC voltage or DC voltage having a sinusoidal voltage superposed thereon. This causes the surfaces of the photosensitive drums 100, which are brought into contact with the electrostatic charging rollers 105, to be uniformly charged to the same potential as that of the DC voltage applied from the high-voltage power supply.

The surface of each of the photosensitive drums 100, charged as above, is exposed at each position irradiated with laser from an associated one of exposure devices 101 to have an electrostatic latent image formed thereon. Thereafter, an associated one of developing devices 102 applies a high voltage generated by superposing a rectangular voltage on a DC voltage to an associated one of developing sleeves 103.

Negatively charged toner is supplied from the associated developing sleeve 103 to the electrostatic latent image on the photosensitive drum 100 at a potential more positive than that of the developing sleeve 103 and more negative than ground, whereby the electrostatic latent image is developed to form a toner image. The toner image is rotated toward an associated one of the primary transfer rollers 107.

The toner images on the four photosensitive drums 100 are sequentially transferred onto the intermediate transfer member 108 by the respective associated primary transfer rollers 107 in superimposed relation (primary transfer) to thereby form a color image. Further, the color image on the intermediate transfer member 108 is transferred onto the recording sheet P by the secondary transfer backup roller 111 and the secondary transfer roller 112 (secondary transfer). Note that high DC voltages for transferring toner images and a color image are also applied from high-voltage power supplies, not shown, to the primary transfer rollers 107 and the secondary transfer roller 112, respectively.

Residual toner remaining on the photosensitive drums 100 is scraped and collected by respective cleaner blades 104. Residual toner remaining on the intermediate transfer member 108 is scraped and collected by an intermediate transfer member cleaner 109. The color image transferred onto the recording sheet P is fixed on the recording sheet P with pressure and temperature applied by the fixing device 113.

Figure 2:
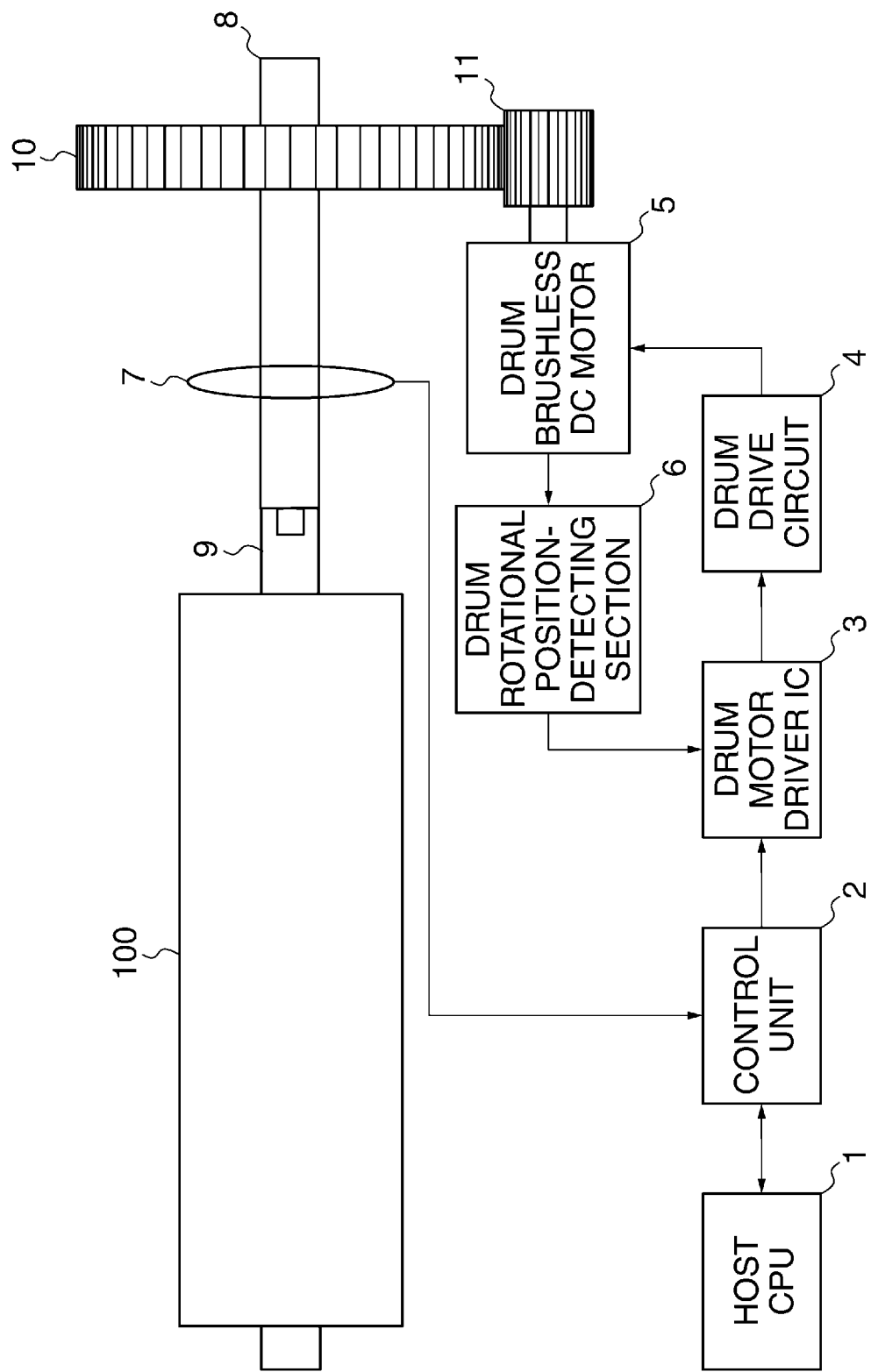
FIG. 2 is a schematic diagram showing the electrical and mechanical arrangement for driving a photosensitive drum.

FIG. 2 is a schematic diagram showing the electrical and mechanical arrangement for driving each photosensitive drum 100.

Referring to FIG. 2, each photosensitive drum 100 has a drum shaft 9 thereof mechanically connected to a drum reduction gear shaft 8, and is rotated by having rotational torque transmitted thereto from a drum brushless DC motor (denoted as "DRUM BLDC MOTOR" in the drawings) 5 by meshing between a drum motor shaft gear 11 and a drum reduction gear 10. The drum reduction gear shaft 8 and the drum reduction gear 10 are fixedly connected by a joint mechanism, not shown.

Further, a drum rotary encoder 7 is fitted on the drum reduction gear shaft 8, and a rotational speed detection value detected by the drum rotary encoder 7 is used for calculating assist torque.

A host CPU 1 collectively controls the start and stop of respective processes in a print process, such as charging, exposure, development, and application of high voltage in primary transfer, and other various setting values. A drum rotational position-detecting section 6 detects a rotational position. Thus, each image bearing member is provided with an image bearing member rotary encoder which uses the rotational shaft of the associated image bearing member as an input shaft.

A control unit 2 which is an ASIC (application specific integrated circuit) receives various command signals, such as a drive on/off signal, a target speed signal, and a register setting value signal, from the host CPU 1, and outputs various control signals, such as a drive on/off control signal and a PWM value signal, to a drum motor driver IC 3. Note that angular speed feedback control based on the rotational speed detection value detected by the drum rotary encoder 7 is performed in calculating assist torque, and hence the control unit 2 is provided with a PID controller, not shown, therein.

The motor driver IC 3 controls, based on a control signal output from the controller 2 and a rotational position signal output from the drum rotational position-detecting section 6, a drum drive circuit 4 so as to switch the phase currents to be supplied to the drum brushless DC motor 5 and adjust the current amounts of the same.

Figure 3:
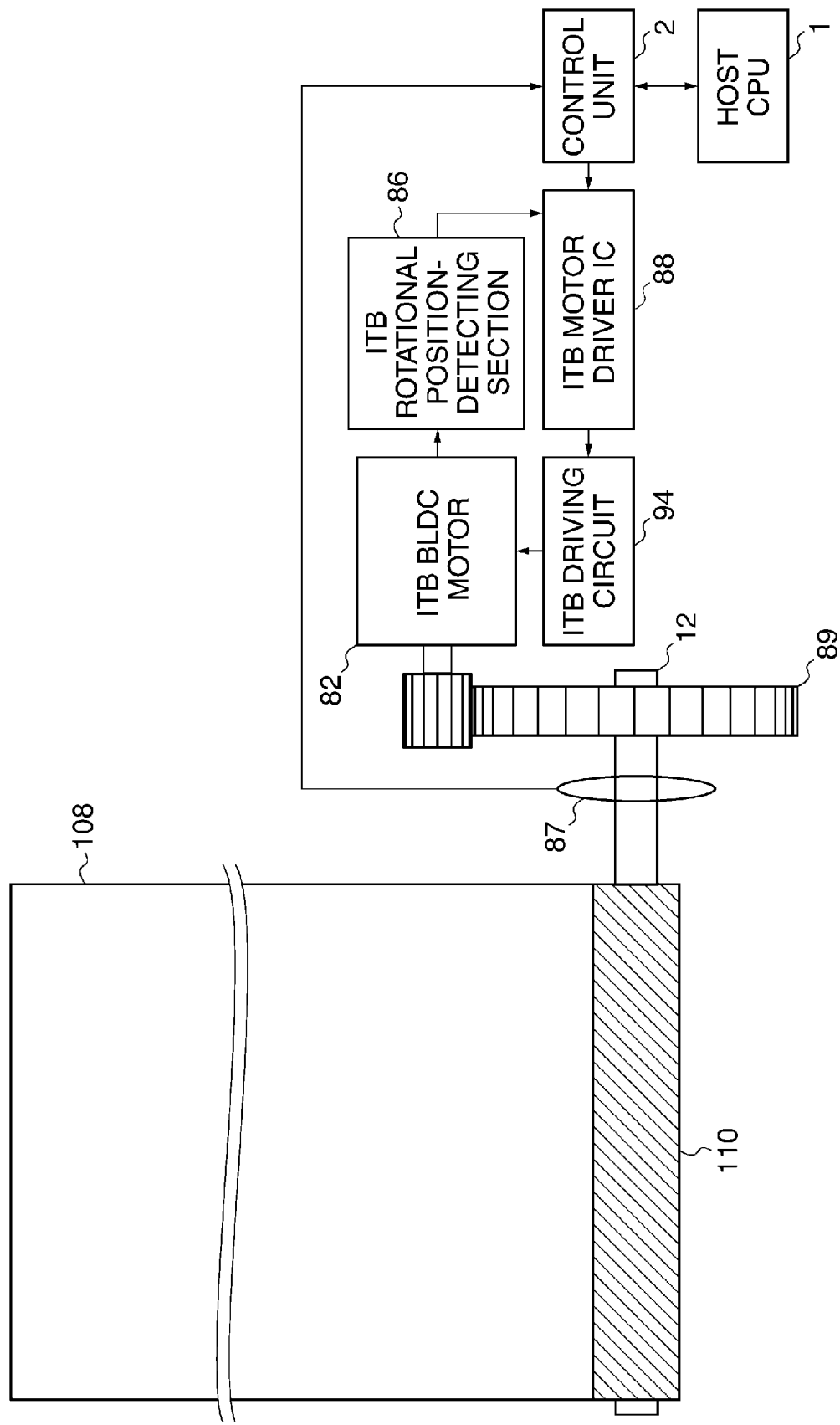
FIG. 3 is a schematic diagram showing the electrical and mechanical arrangement for driving an intermediate transfer member.

FIG. 3 is a schematic diagram showing the electrical and mechanical arrangement for driving the intermediate transfer member 108.

Referring to FIG. 3, the intermediate transfer member 108 is driven for rotation by driving an intermediate transfer member-driving roller 110 for rotation, which is disposed in a manner brought into contact with the inner side of the intermediate transfer member 108. An intermediate transfer member reduction gear 89 and an intermediate transfer member rotary encoder 87 are fixedly fitted on an intermediate transfer member-driving roller shaft 12, and the intermediate transfer member-driving roller 110 is rotated by reducing the speed of an intermediate transfer member brushless DC motor (denoted as "ITB BLDC MOTOR" in FIG. 3) 82 by the intermediate transfer member reduction gear 89. The electrical arrangement for driving the intermediate transfer member 108, including the host CPU 1, the control unit 2, an intermediate transfer member motor driver IC (denoted as "ITB MOTOR DRIVER IC" in FIG. 3) 88, an intermediate transfer member-driving circuit (denoted as "ITB-DRIVING CIRCUIT" in FIG. 3) 94, and an intermediate transfer member rotational position-detecting section (denoted as "ITB ROTATIONAL POSITION-DETECTING SECTION" in FIG. 3) 86 is the same as that for driving each photosensitive drum 100.

During the print process, the intermediate transfer member 108 is driven according to the angular speed feedback control based on a detection value (rotational speed detection value) detected by the intermediate transfer member rotary encoder 87. Note that in the angular speed feedback control, a PID controller, not shown, controls the speed such that a difference between a target speed (hereinafter referred to as the "process speed") instructed by the host CPU 1 and a value obtained by converting the detection value from the intermediate transfer member rotary encoder 87 to a process speed becomes small. Thus, there is provided the intermediate transfer member rotary encoder which uses the rotational shaft of a rotating member for driving the intermediate transfer member, as an input shaft. Further, in FIGS. 2 and 3, the control unit 2 corresponds to a count unit configured to count pulses output from the drum rotary encoder 7 and the intermediate transfer member rotary encoder 87.

Figure 4:
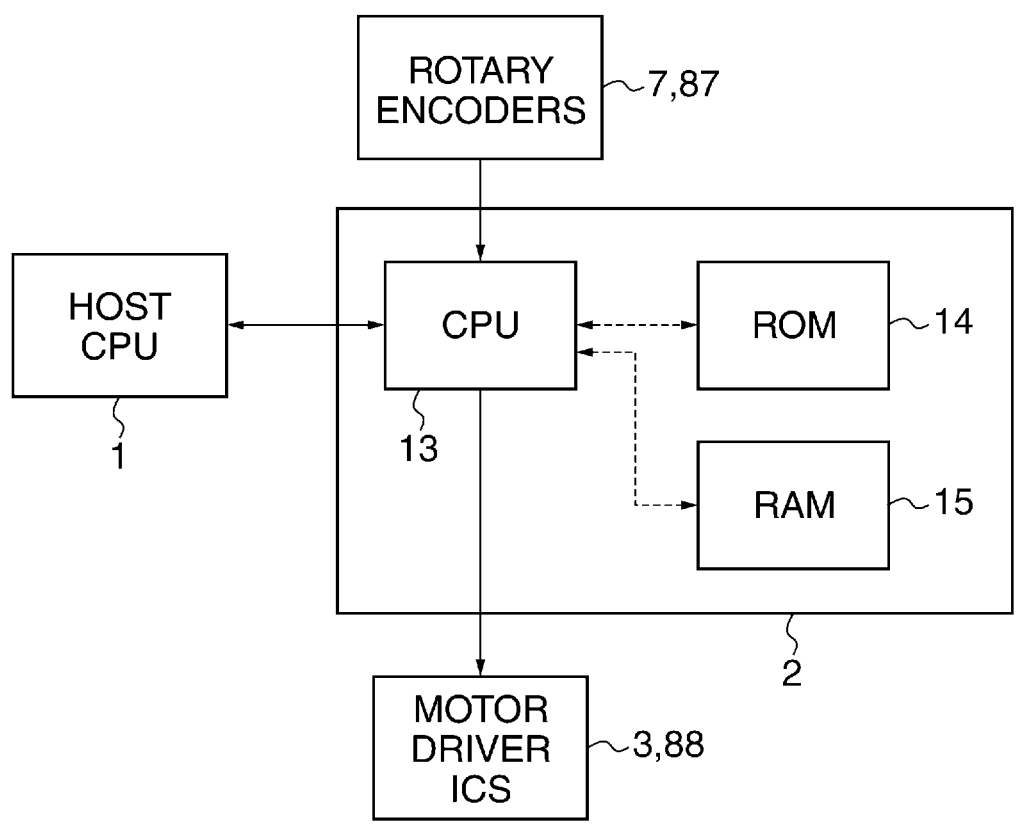
FIG. 4 is a schematic block diagram of a control unit appearing in FIG. 2.

FIG. 4 is a block diagram of the control unit 2 appearing in FIG. 2.

Referring to FIG. 4, the control unit 2 comprises a CPU 13, a ROM 14, and a RAM 15. The CPU 13 which drivingly controls each photosensitive drum 100 performs the angular speed feedback control using the associated PID controller based on the detection value from the associated drum rotary encoder 7 when calculating assist torque. However, during the print process, the CPU 13 outputs a PWM signal at a predetermined duty ratio corresponding to the calculated assist torque to the drum motor driver IC 3.

Figure 5:
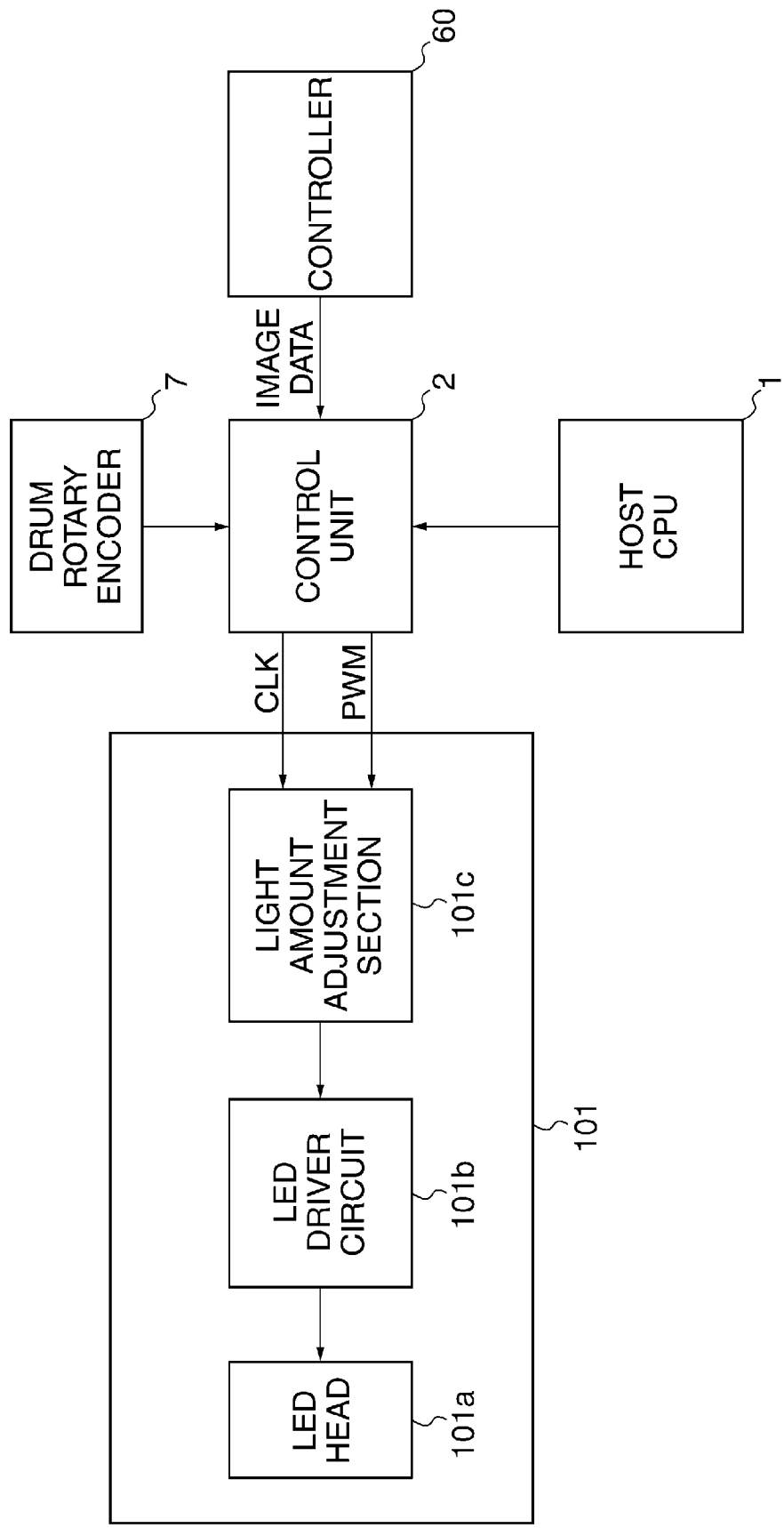
FIG. 5 is a schematic block diagram of an exposure device and components associated therewith.

FIG. 5 is a schematic block diagram of the exposure device 101 and components associated therewith.

Referring to FIG. 5, the exposure device 101 connected to the control unit 2 comprises an LED head 101a, an LED driver circuit 101b that drives LED elements, and a light amount adjustment section 101c. Further, a controller 60 is configured to output image data to the control unit 2.

Figure 6:
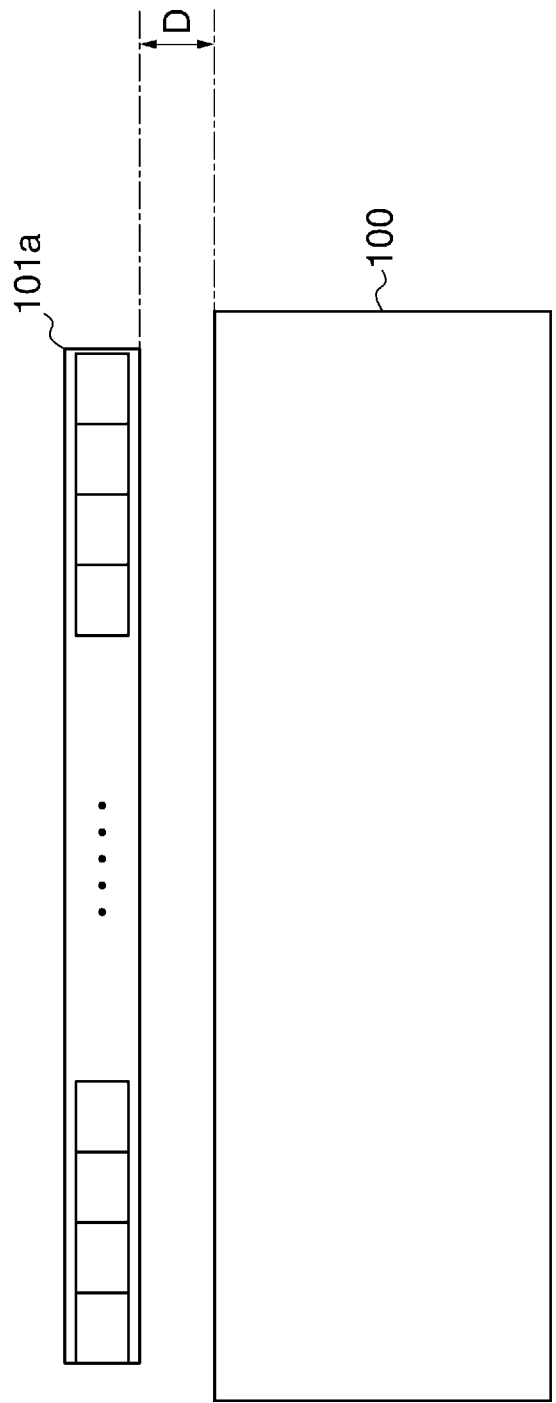
FIG. 6 is a diagram showing the disposition of an LED head appearing in FIG. 5 with respect to the photosensitive drum.

FIG. 6 is a diagram showing the disposition of the LED head 101a appearing in FIG. 5 with respect to an associated one of the photosensitive drums 100.

Referring to FIG. 6, the LED head 101a is fixed by a supporting member, not shown, to a location spaced from the photosensitive drum 100 by a predetermined distance D.

Figure 7:
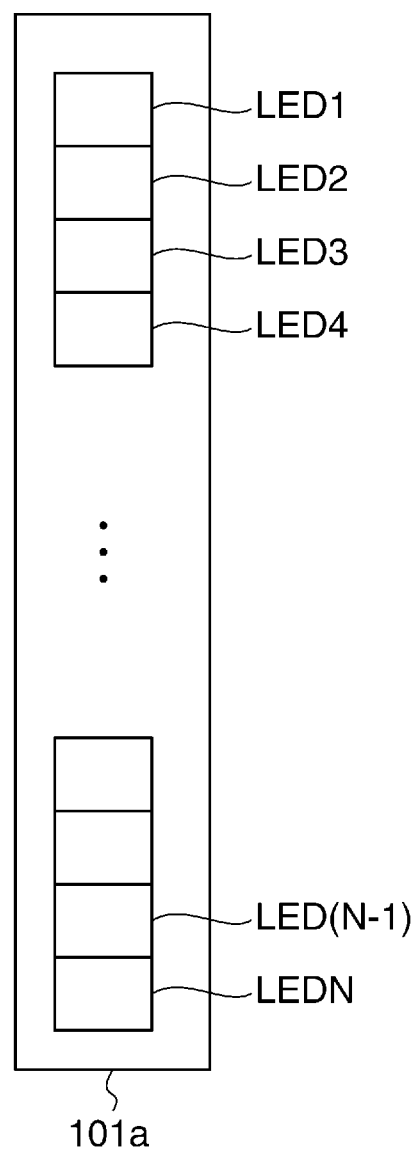
FIG. 7 is a schematic diagram of the LED head appearing in FIG. 5.

FIG. 7 is a schematic diagram of the LED head 101a appearing in FIG. 5.

Referring to FIG. 7, the LED head 101a is formed by arranging a plurality of small LED elements LED1 to LEDN in a main scanning direction.

Figure 8:
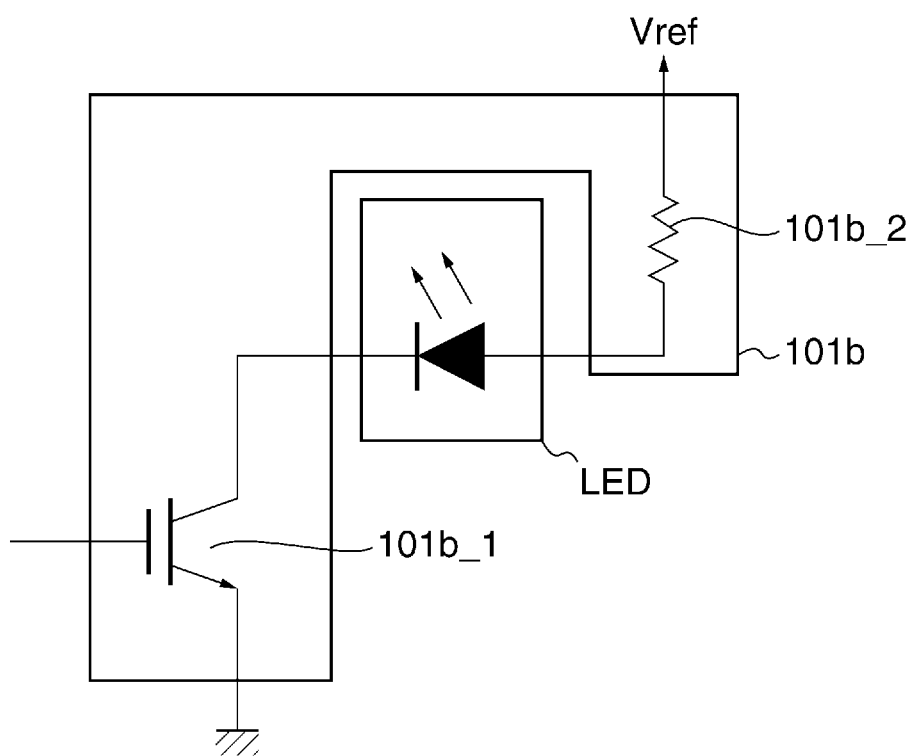
FIG. 8 is a schematic diagram of a circuit portion, associated with each LED element, of an LED driver circuit appearing in FIG. 5.

FIG. 8 is a schematic diagram of a circuit portion, associated with each LED element, of the LED driver circuit 101b appearing in FIG. 5.

Referring to FIG. 8, the LED element-associated portion of the LED driver circuit 101b comprises a transistor 101b_1 and a register 101b_2, and the transistor 101b_1 is connected to a cathode of an LED element, and the register 101b_2 is connected to an anode of the LED.

Referring again to FIG. 5, the control unit 2 divides the image data sent from the controller 60 into data of the respective colors of Y, M, C, and K, and also calculates, based on the image data, an amount of light emission of each of LED elements arranged in the main scanning direction of the LED head 101a. The light emission amount is adjusted, in the present embodiment, by a light emission time period.

Further, the control unit 2 starts or stops exposure when an LED exposure start timing signal, an LED exposure stop timing signal, or an exposure enable signal is input from the host CPU 1. The control unit 2 outputs emission time information associated with each LED element to the light amount adjustment section 101c as a CLK signal and a PWM signal.

The light amount adjustment section 101c sequentially selects respective bases of the transistors 101b_1 of the LED element-associated portions forming the LED driver circuit 101b, starting from one associated with the LED element LED1 based on the CLK signal. Then, the light amount adjustment section 101c causes an associated LED element to be driven by a PWM signal determining a voltage-on time period of each selected base, whereby an electrostatic latent image associated with the image data is formed in the main scanning direction.

As to the image forming apparatus 1000 configured as described above, first, a description will be given of a method of driving each photosensitive drum 100 and the intermediate transfer member 108.

In the present embodiment, each photosensitive drum 100 is friction-driven by the intermediate transfer member 108. In the friction driving, the control of rotational torque applied to the photosensitive drum 100 is performed by driving the photosensitive drum 100 using a frictional force between contact portions of the surface of the photosensitive drum 100 and the surface of the intermediate transfer member 108 at a primary transfer section.

Figure 9:
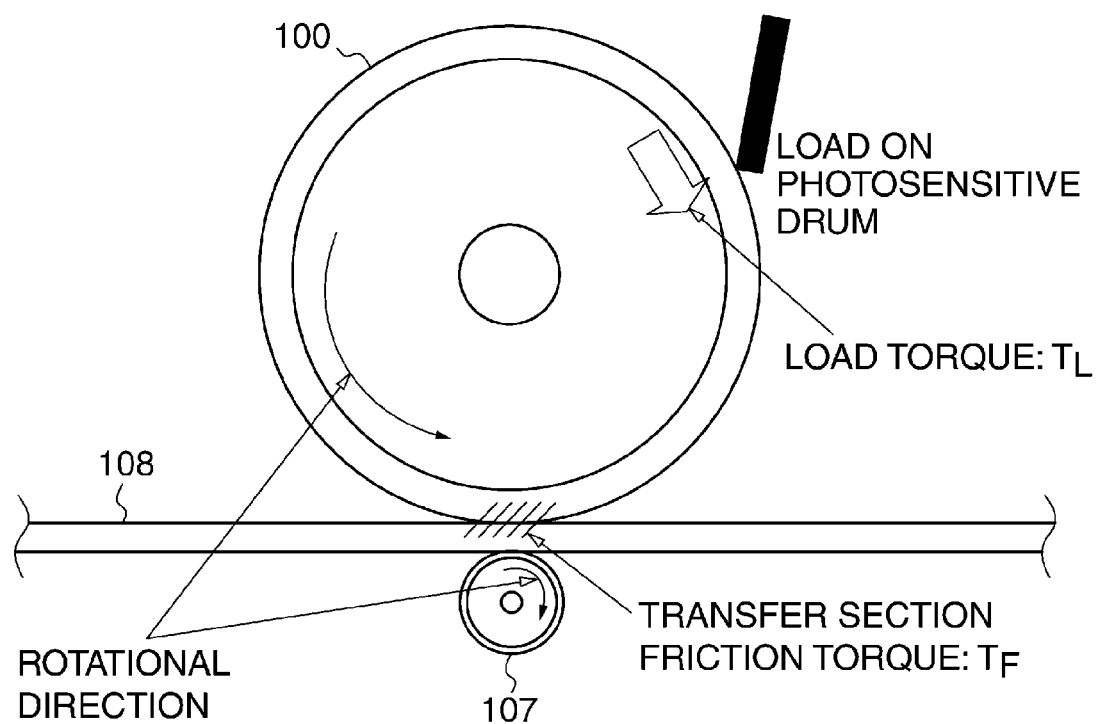
FIG. 9 is a diagram useful in explaining load torque on a drum shaft and transfer section friction torque, which are generated when the photosensitive drum is driven at a predetermined process speed.

FIG. 9 is a diagram useful in explaining load torque on the drum shaft 9 and transfer section friction torque, which are generated when the photosensitive drum 100 is driven at a predetermined process speed.

Note that the transfer section friction torque indicated in FIG. 9 is obtained by converting the frictional force generated at the primary transfer section to torque of the rotational shaft of the photosensitive drum 100.

The photosensitive drum 100 has load torque always generated thereon in a direction opposite to the rotational direction, by frictional forces generated by the cleaner blade 104, a bearing of the drum shaft 9, etc. The above-mentioned load torque $T_L$ is much larger than a maximum value $T_F$ of the transfer section friction torque, and hence the photosensitive drum 100 cannot be friction-driven by the transfer section friction torque alone.

Figure 10:
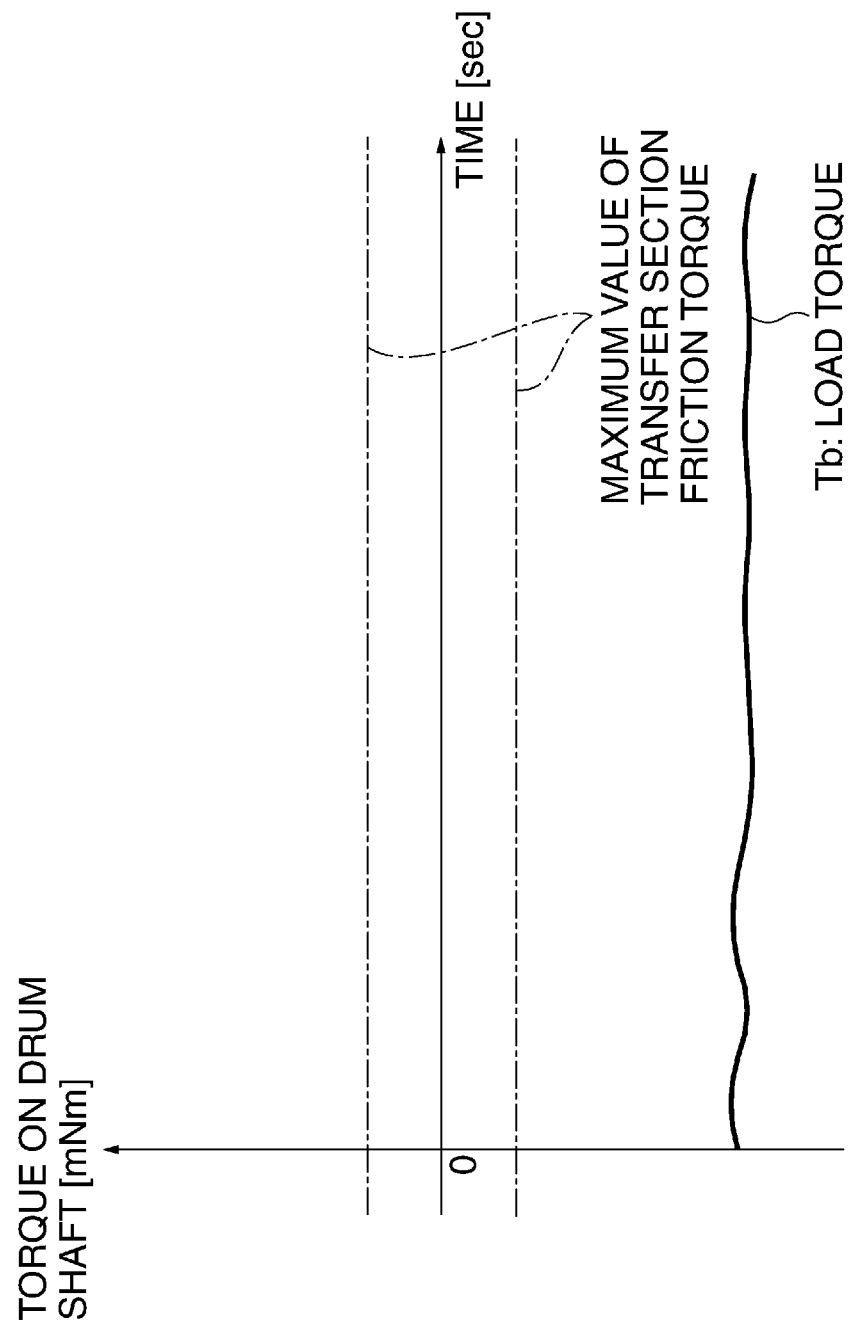
FIG. 10 is a diagram showing types of torque on the drum shaft.

FIG. 10 is a diagram showing types of torque on the drum shaft 9.

Referring to FIG. 10, the vertical axis represents load torque on the drum shaft, and the horizontal axis represents time. FIG. 10 shows a relationship between transient changes in the load torque on the drum shaft 9 during the print process and the transfer section friction torque.

As shown in FIG. 10, the load torque is not always constant, but undergoes transient changes depending on a timing at which a high charge voltage is applied, a timing at which remaining toner which has not been transferred enters the cleaner 104, and the like.

However, it is known that this transient change component (hereinafter referred to as the "varying torque component") is sufficiently small with respect to the load torque which is constantly generated. In view of this, by applying the same amount of rotational torque as that of a DC-like component of the load torque to the photosensitive drum 100 using the drum brushless DC motor 5, it is possible to offset the DC-like component of the load torque generated on the photosensitive drum 100. Thus applied rotational torque is referred to as the assist torque.

Figure 11:
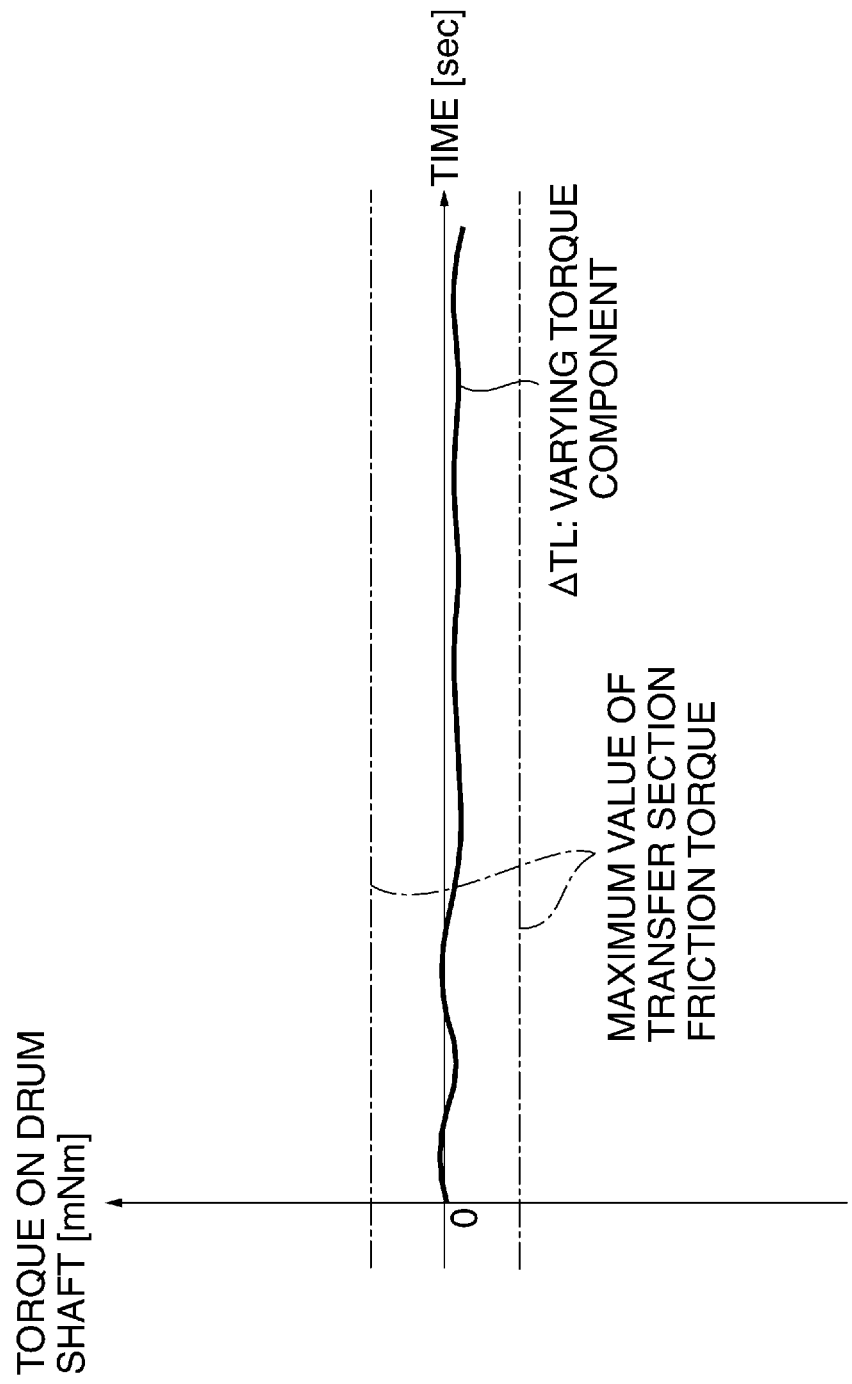
FIG. 11 is a diagram showing transient changes in load on the drum shaft when assist torque is generated.

FIG. 11 is a diagram showing transient changes in load torque on the drum shaft 9 when the assist torque is generated.

Referring to FIG. 11, the vertical axis represents the load torque generated on the drum shaft 9, and the horizontal axis represents time. As shown in FIG. 11, if the varying torque component, which undergoes AC-like variation, is not larger than the maximum value $T_F$ of the transfer section friction torque TF, the photosensitive drum 100 can be friction-driven by the intermediate transfer member 108.

On the other hand, unless the photosensitive drum 100 follows up changes in the speed of the intermediate transfer member 108, it is not possible to ensure followability with respect to an AC-like speed variation. That is, the friction driving is realized on condition that the following expressions of motion are always satisfied during the image formation process:

$$|T_F| \geq J \times d\omega/dt + T_L - T_{AS} \quad (1)$$

$$|T_F| \geq J \times d\omega/dt + \Delta T_L \quad (2)$$

In the above expressions, $T_F$ represents the maximum transfer section friction torque, J the inertia of the drum shaft 9 (hereinafter referred to as the "drum inertia"), $d\omega/dt$ the angular acceleration, $T_L$ the load torque, $T_{AS}$ the assist torque, and $\Delta T_L$ the varying torque component.

The expressions (1) and (2) indicate that the same amount of rotational torque as that of the DC-like component of the load torque $T_L$ is generated as the assist torque $T_{AS}$ in a direction opposite to the load torque to thereby reduce the amount of transfer section friction torque required to be applied to a range smaller than the maximum transfer section friction torque $T_F$.

Further, the above expressions indicate that the friction driving can be performed on condition that the sum of the acceleration torque and the varying torque component of the photosensitive drum 100 is always within the maximum transfer section friction torque. The acceleration torque is expressed by multiplication of the drum inertia and the angular speed of the photosensitive drum 100.

Note that the angular speed of each photosensitive drum 100 is a value determined based a surface speed varying component of the intermediate transfer member 108 detected at the primary transfer section. Further, the drum inertia expresses all rotating loads as the inertia component on the drum shaft 9.

Figure 12:
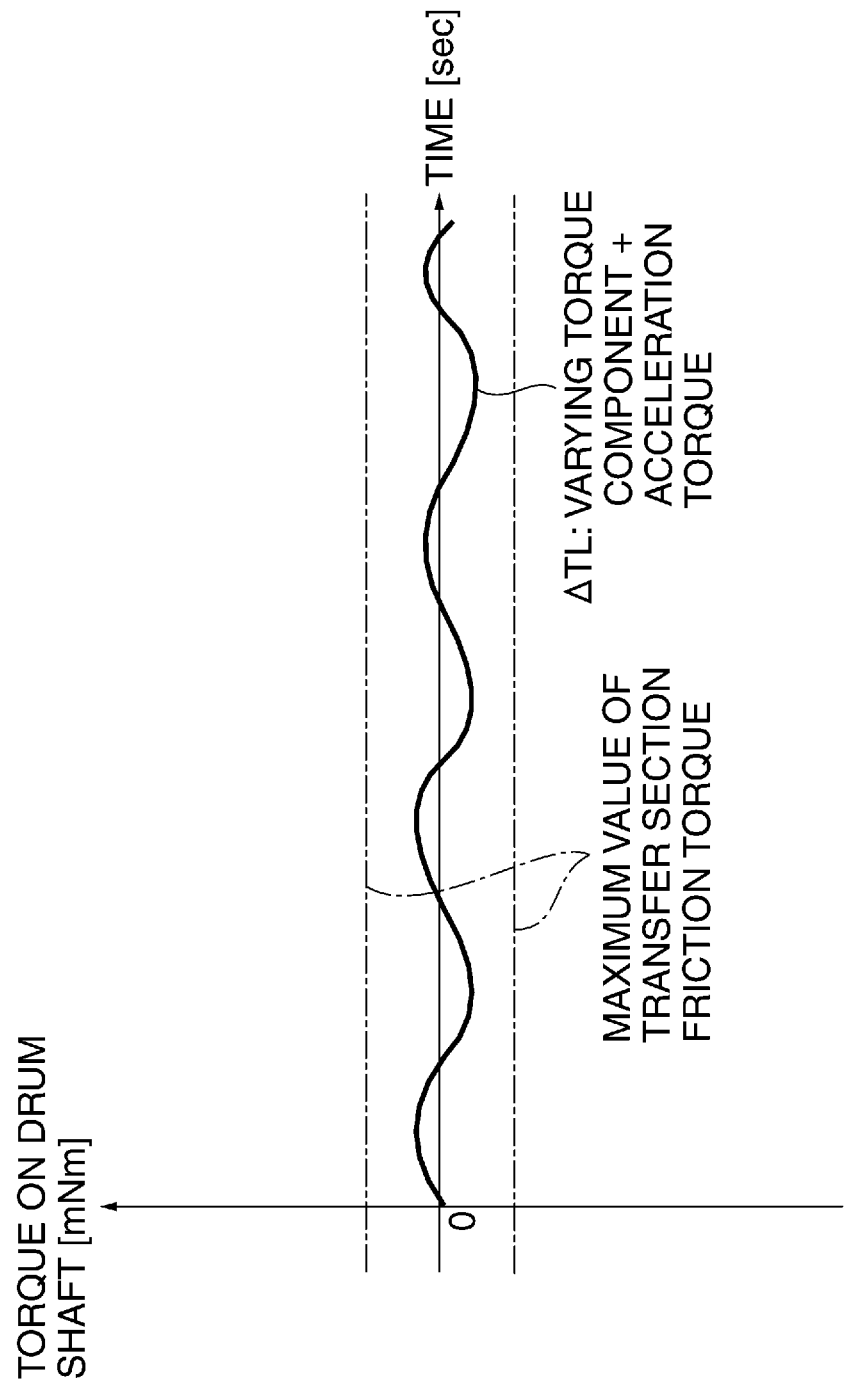
FIG. 12 is a diagram showing transient changes in load torque as the sum of acceleration torque and a varying torque component.

FIG. 12 is a diagram showing transient changes in load torque as the sum of acceleration torque and the varying torque component.

Referring to FIG. 12, the vertical axis represents load torque on the drum shaft 9, and the horizontal axis represents time. Basically, the varying torque component $\Delta T_L$ can be regarded as a negligibly small one. Therefore, to increase the friction driving capability (followability) by torque other than the assist torque $T_{AS}$, it is envisaged to increase the maximum transfer section friction torque $T_F$ or reduce the acceleration torque ($J \times d\omega/dt$).

It is not easy to change the maximum transfer section friction torque $T_F$ because the maximum transfer section friction torque $T_F$ is closely associated with the toner transfer process in the primary transfer. On the other hand, reduction of the acceleration torque ($J \times d\omega/dt$) can be relatively easily realized by reducing the drum inertia J.

An inertia component of the brushless DC motor appearing on the drum shaft is largely influenced by a gear ratio between the reduction gear and the motor shaft gear, and is represented by a value obtained by multiplying the motor shaft inertia by the square of the gear ratio.

Therefore, the inertia of a rotor of the brushless DC motor sometimes becomes much larger than the inertia component of the photosensitive drum 100 acting on the drum shaft 9. To cope with this, the brushless DC motor in the present embodiment employs a low-inertia brushless DC motor of an inner-rotor type.

This makes it possible to largely reduce the drum inertia, and as a result, the acceleration torque is also largely reduced. As mentioned above, by offsetting the DC-like component of the load torque on the drum shaft 9 by applying the assist torque, and also by selecting the low-inertia motor, it is fully possible to cause the photosensitive drum 100 to be friction-driven by the intermediate transfer member 108. Although in the present embodiment, the drum brushless DC motor 5 is used as a generation source of the assist torque, this is not limitative, but any other component may be employed insofar as it is capable of generating constant torque.

Next, calculation of the assist torque will be described. In general, when the main power is turned on, first, the image forming apparatus enters a state referred to as the adjustment mode. In the adjustment mode, adjustment of temperature of fixing rollers of the fixing device 113, correction of inclination of the main scanning line, correction of displacement between colors, and so forth are performed. Only after completion of the adjustment mode, the user becomes capable of instructing a print operation.

In the present embodiment, a process for calculating the assist torque is executed in the adjustment mode. In general, the multifunction peripheral is capable of performing processing at a plurality of process speeds e.g. so as to cope with thick paper, and also in the image forming apparatus according to the present embodiment, a plurality of process speeds can be set. Therefore, the assist torque is required to be calculated on a process speed-by-process speed basis.

The assist torque is calculated by measuring load on the drum shaft 9 generated during the print process. To this end, in the present embodiment, load on the drum shaft 9 is calculated from a value of torque generated by the drum brushless DC motor 5.

As the drum motor driver IC 3, a driver IC is used which determines an amount of a phase current applied to the drum brushless DC motor 5 based on the PWM signal. The PWM signal is a pulse width modulation signal which is a rectangular wave signal generated at a constant frequency, and the phase current is adjusted based on a duty ratio determined according to a high-level duration of the PWM signal.

When the duty ratio is large, the amount of electric current applied to each phase increases, whereas when the duty ratio is small, the amount of electric current applied to the phase decreases. The magnitude of the phase current is equivalent to torque generated in the motor. Since the magnitude of the phase current is proportional to the duty ratio, the duty ratio can be regarded as torque generated by the motor. Further, to detect the load torque on the drum shaft 9 generated during the print process, it is necessary to control the photosensitive drums 100 to rotate at the target process speed.

To calculate the assist torque, first, the primary transfer rollers 107 are separated from the intermediate transfer member 108. Further, it is desired to calculate the assist torque under conditions where interference by the electrostatic charging rollers 105, the developing devices 102, toner, and the blades of the cleaners 104 influence the load torque, and hence the calculation of the assist torque is performed during the image formation process.

However, a varying torque component of load in the image formation process is sufficiently small compared with a constantly generated component of the load, and hence in calculating the assist torque, the image forming apparatus may be in an idling state.

The calculation of the assist torque will be described. First, the host CPU 1 instructs a driver IC (not shown) of a stepper motor for moving the primary transfer rollers 107 up and down, to cause the primary transfer rollers 107 to retract (be moved down). Next, the host CPU 1 controls the various devices which execute the image formation process, such as the exposure devices 101, the electrostatic charging rollers 105, and the developing devices 102, and provides an instruction for driving the photosensitive drums 100.

Figure 13:
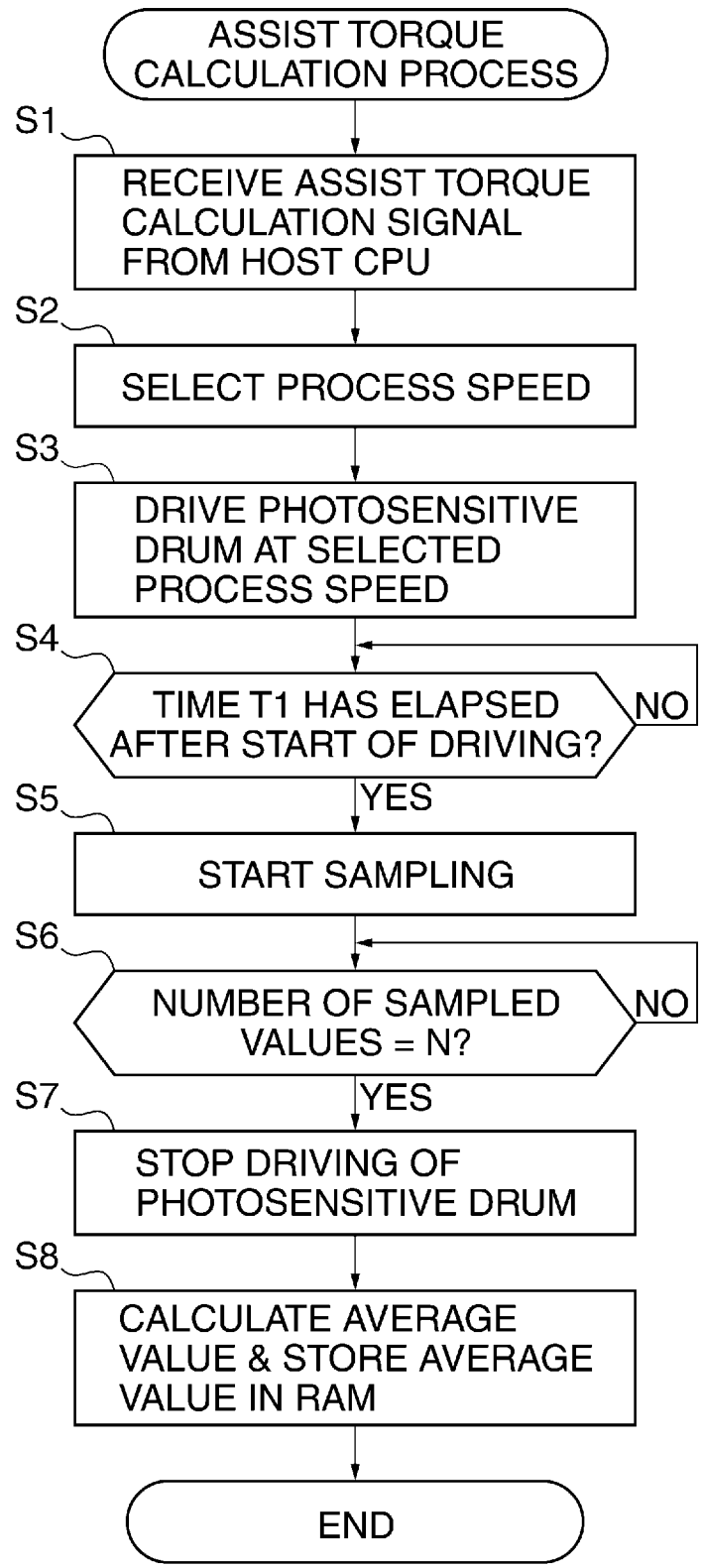
FIG. 13 is a flowchart of an assist torque calculation process executed by a CPU appearing in FIG. 4.

FIG. 13 is a flowchart of an assist torque calculation process executed by the CPU 13 appearing in FIG. 4.

Referring to FIG. 13, in the adjustment mode, the CPU 13 receives assist torque calculation command signals of a process speed setting value, an assist calculation-on command, etc. from the host CPU 1 (step S1). Then, the CPU 13 selects one of a plurality of process speeds for calculating assist torque according to a thickness of an associated recording sheet P and the like (step S2).

Then, the CPU 13 starts the angular speed feedback control for controlling each photosensitive drum 100 at the selected process speed, and causes the photosensitive drums 100 to be driven at the selected process speed by outputting a control signal to the motor driver IC 3 (step S3).

When a predetermined time period T1 elapses after the start of driving of the photosensitive drum 100 (YES to a step S4), the CPU 21 starts sampling of the duty ratio of the PWM signal and stores the sampled value in the RAM 23 (step S5). The above-mentioned time T1 is set to be not shorter than a time period required for toner supplied from each developing device 102 to an associated one of the photosensitive drums 100 to reach an associated one of the cleaner blades 104, and is also defined based on a time period required for the rotational speed of the photosensitive drums 100 to become stable after the start.

When the number of sampled values becomes equal to a predetermined number N (YES to a step S6), the CPU 13 stops sampling of the duty ratio, stops operating the exposure devices 101, and stops high-voltage power supply to the electrostatic charging rollers 105, the developing devices 102, and the primary transfer rollers 107. Then, the CPU 13 causes the photosensitive drums 100 to rotate through once or two revolutions, and stops driving of the photosensitive drums 100 by outputting a drive stop command (step S7). The photosensitive drums 100 are rotated through one or two revolutions so as to remove toner on the photosensitive drums 100 by the cleaner blades 104.

Next, the CPU 13 calculates the average value of the sampled duty ratios by the following equation (3):

$$P_{ave} = \frac{P_1 + P_2 + P_3 + \ldots + P_N}{N} \quad (3)$$

wherein $P_{ave}$ represents the average value of the PWM duty ratios, $P_N$ represents N-th sampled data, and N represents the number of sampled values.

Then, the CPU 13 stores the average value ($P_{ave}$) in the RAM 15 (step S8), followed by terminating the present process. As a result, the assist torque for one process speed can be calculated. By executing the above-described process for each of the process speeds, the assist torques at the process speeds can be calculated.

Although in the above-described process, the assist torque is calculated in a state where the photosensitive drums 100 are out of contact with the intermediate transfer member 108 at the respective primary transfer sections, this is not limitative, but any other process can be executed insofar as the same amount of torque as that of the DC-like component of the load torque generated on the photosensitive drums 100 can be calculated.

Next, a method of controlling exposure in a sub scanning direction, executed by each exposure device 101 as a single unit, will be described. The exposure control in the sub scanning direction is performed in synchronism with a detection value detected by the drum rotary encoder 7. This is for performing exposure control in synchronism with rotation of the photosensitive drum 100 to thereby avoid positional displacement during exposure due to a surface speed variation of the photosensitive drum 100 caused in the case of time-synchronized exposure.

The image forming apparatus 1000 is configured to form image data of 600 dpi on a recording sheet. Since the resolution is 600 dpi, the distance between lines in the sub scanning direction is approximately 42.3 µm which is obtained by dividing 2.54 cm by 600 (hereinafter denoted as "ΔL").

The rotational speed of the photosensitive drums 100 is converted to the surface speed $V_s$ based on the detection value from the drum rotary encoder 7, and a sub scanning exposure timing interval Δt is calculated by dividing ΔL by $V_s$.

Figure 14:
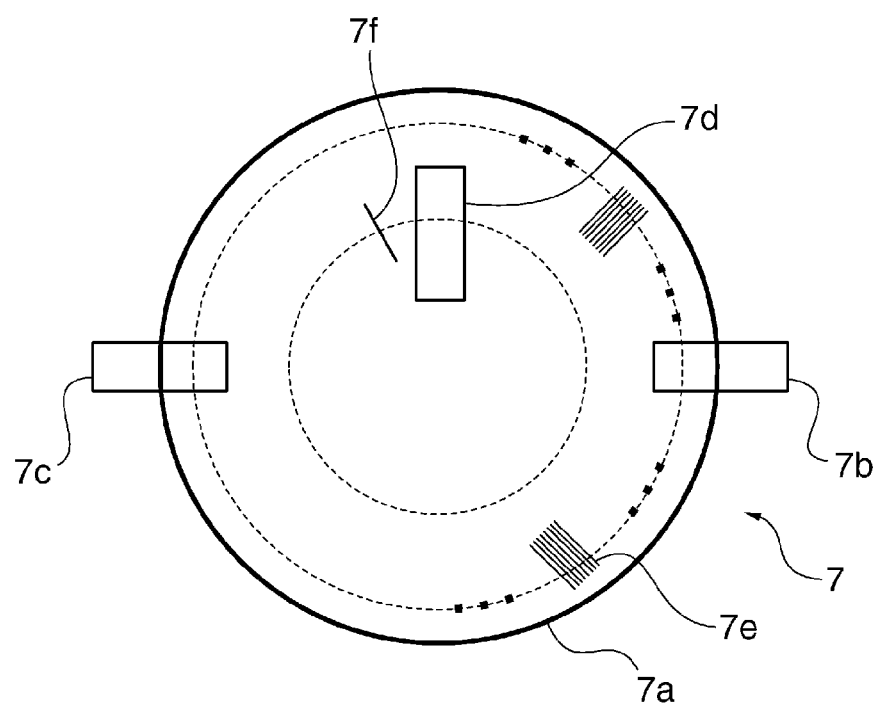
FIG. 14 is a schematic diagram of a drum rotary encoder appearing in FIG. 2.

FIG. 14 is a schematic diagram of the drum rotary encoder 7 appearing in FIG. 2.

Referring to FIG. 14, the drum rotary encoder 7 comprises a wheel 7a, and photosensors 7b, 7c, and 7d. The photosensors 7b and 7c are disposed to detect slits 7e (only some of the slits 7e at two locations are shown in FIG. 14) formed at equally-spaced intervals along the whole circumference of the wheel 7a, while the photosensor 7d is configured to detect a slit 7f which is formed at only one circumferential location of the wheel 7a.

The wheel 7a is fixedly fitted on the reduction gear shaft, and the photosensors 7b, 7c, and 7d are fixedly disposed by a member, not shown. In the present embodiment, the number of the wheel slits 7e is set to 800 by way of example.

The rotational speed detection using the drum rotary encoder 7 is performed by the CPU 13 of the control unit 2 executing computational processing using an average value of the detection values by the photosensor 7b and the photosensor 7c.

The intermediate transfer member rotary encoder 87 has substantially the same construction as that of the drum rotary encoder 7 except that components corresponding to the photosensor 7d and the slit 7f are omitted and only one of components corresponding to the photosensors 7b and 7c is provided for outputting pulses to be counted, and hence detailed description thereof is omitted.

Figure 15:
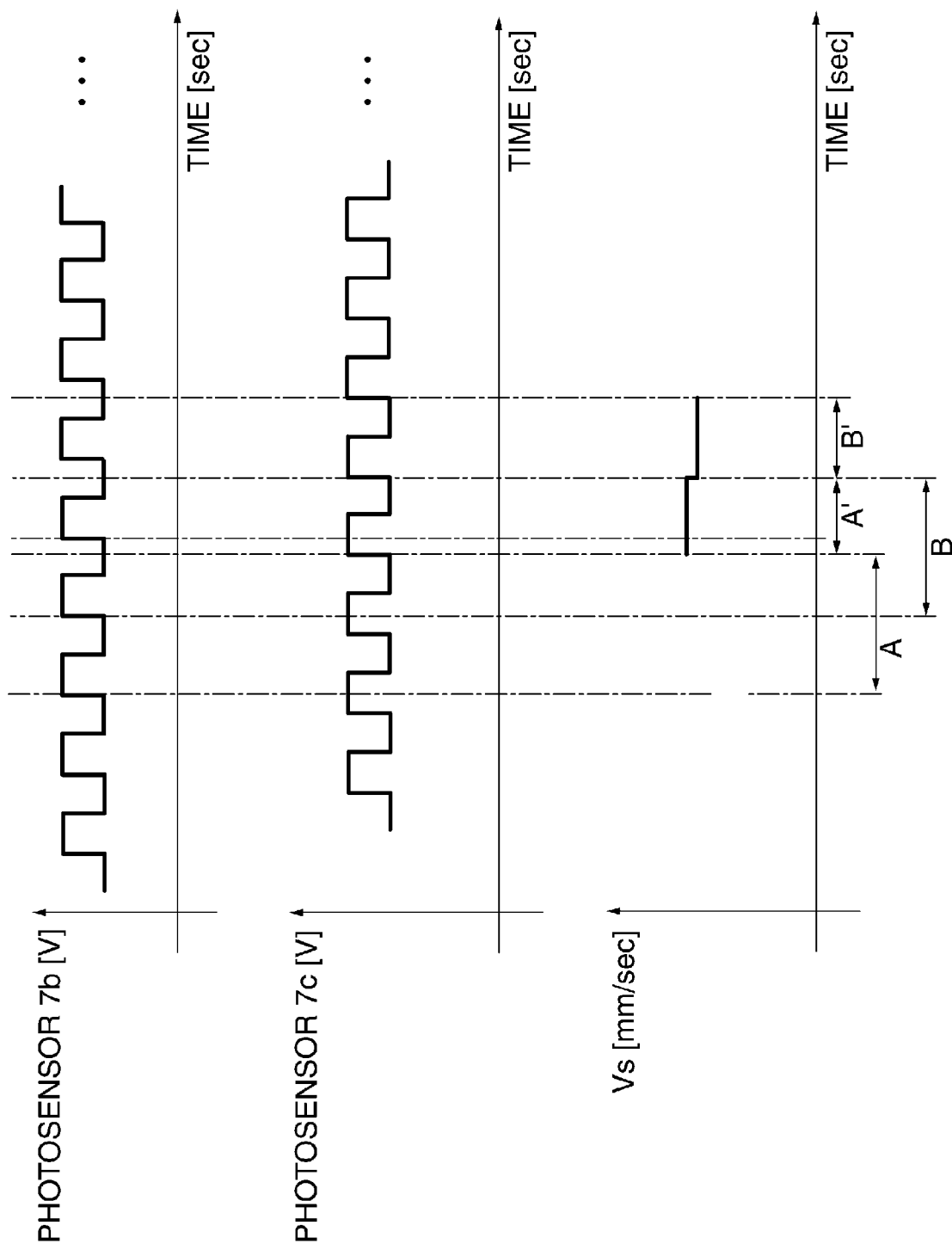
FIG. 15 is a timing diagram useful in explaining conversion from values detected by photosensors to a surface speed.

FIG. 15 is a timing diagram useful in explaining conversion of the detection values by the photosensors 7b and 7c to the surface speed $V_s$.

Referring to FIG. 15, when the photosensitive drum 100 starts to rotate, square-wave pulses are generated by the photosensors 7b and 7c detecting the slits 7e.

When each slit 7e is detected by each photosensor, a signal output from the corresponding photosensor to the control unit 2 is at a high level, whereas when no slits 7e are detected by each photosensor, the signal output from the corresponding photosensor to the control unit 2 is at a low level.

The CPU 13 of the control unit 2 detects a rising edge of a signal from one of the two photosensors 7b and 7c at which the signal level is changed from low to high, and further, counts a time period until detection of a second rising edge, thereafter, of a signal from the other of the two photosensors 7b and 7c to thereby calculate a time period $T_{ENC}$ between the rising edges.

At a timing of determination of two successive values of the time period $T_{ENC}$, an average value $T_{ENCAVE}$ based on the outputs from the two photosensors 7b and 7c is calculated as a rotational speed detection value. More specifically, to associate the rotational speed detection value with a single slit, an average value of the two values of the time period $T_{EN}$ is divided by 2 to give the average value $T_{ENCAVE}$ as the rotational speed detection value.

Sections A and B in FIG. 15 are speed detection sections during which the photosensors 7b and 7c perform detection, and the CPU 13 of the control unit 2 acquires the rotational speed detection value in the sections A' and B'. Note that FIG. 15 shows the result in which a rising edge of the signal output from the photosensor 7b is detected earlier when calculating the average value.

The surface speed $V_s$ is calculated from the average value $T_{ENCAVE}$ thus calculated, the radius R of each photosensitive drum 100 (design value), and the number of the wheel slits 7e of the drum rotary encoder 7 (800 in the present embodiment) by the following equation (4):

$$V_S = \frac{2\pi R}{800} \div T_{ENCAVE} \quad (4)$$

wherein R represents the radius of the drum (design value), and $T_{ENCAVE}$ represents the detection value (time period) from the rotary encoder.

By dividing ΔL by $V_S$ using the following equation (5), it is possible to define the sub scanning exposure timing interval Δt for exposure processing by the exposure device 101 as a single unit.

$$\Delta t = \Delta L \div V_S \quad (5)$$

wherein Δt represents the sub scanning exposure timing interval, ΔL represents a target sub scanning direction pitch distance, and $V_S$ represents a surface speed converted from the rotary encoder detection value.

Figure 16:
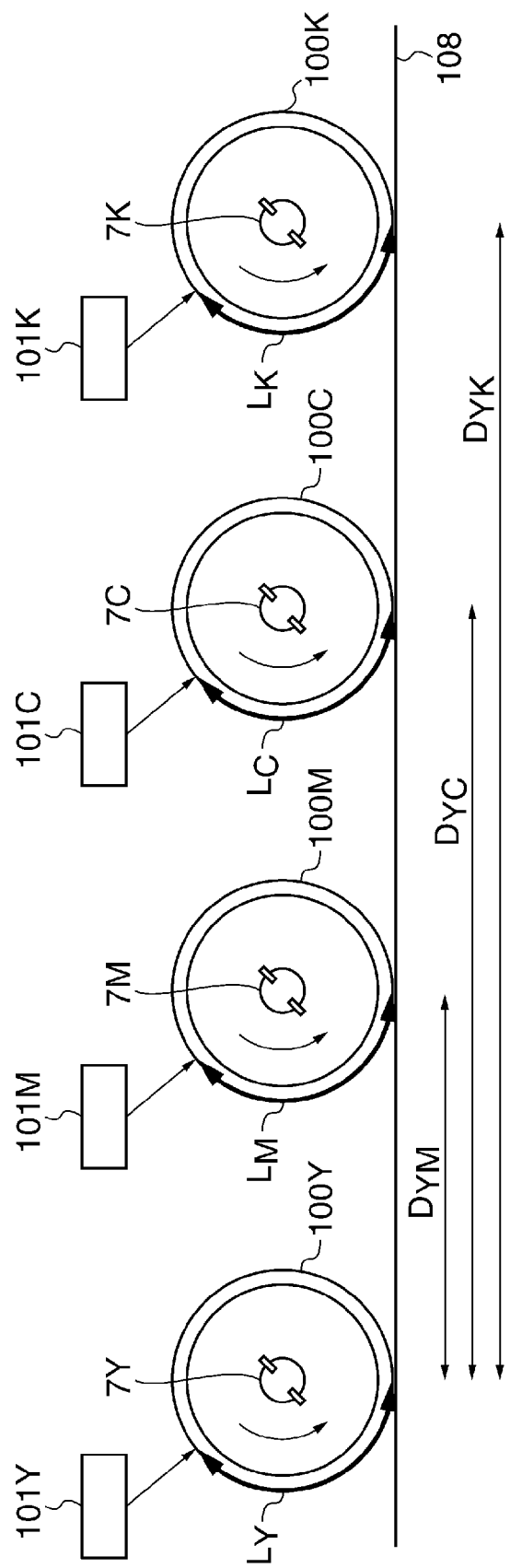
FIG. 16 is a diagram showing a distance from an exposure light irradiated position to a primary transfer position on each photosensitive drum, and a distance from a photosensitive drum as a first image bearing member to each photosensitive drum as a second image bearing member.

FIG. 16 is a diagram showing a distance L ($L_Y$, $L_M$, $L_C$, $L_K$) between an exposure light irradiated position and a primary transfer position of each photosensitive drum 100, and a distance D ($D_{YM}$, $D_{YC}$, $D_{YK}$) from the photosensitive drum 100Y (first image bearing member) to each of the other photosensitive drums 100M, 100C, and 100K (second image bearing member).

Figure 17:
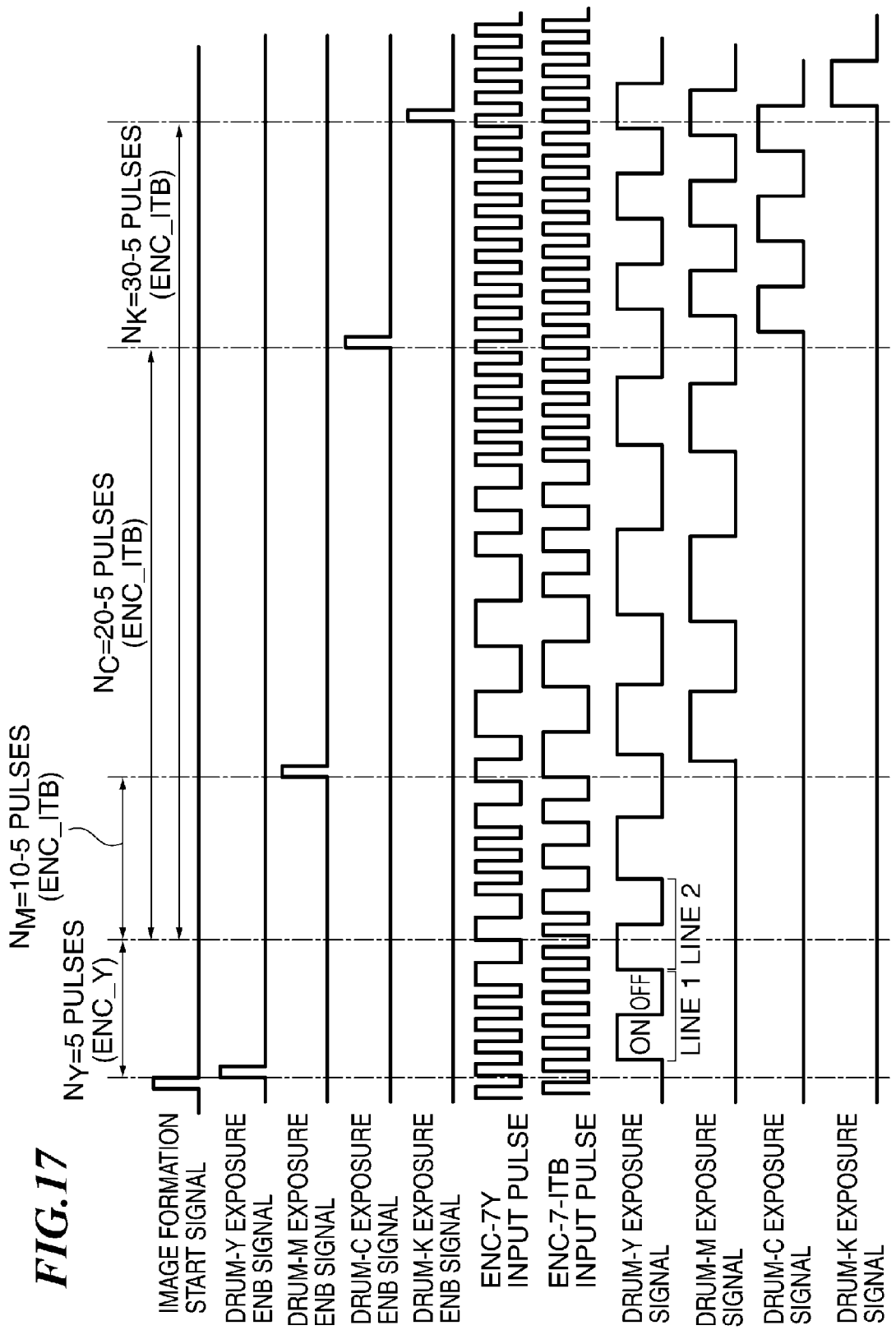
FIG. 17 is a timing diagram of exposure control.

FIG. 17 is a timing diagram of the exposure control.

In FIG. 17, values are entered only by way of example. First, upon receipt of an image formation start signal from the host CPU 1, the CPU 13 starts exposure of the photosensitive drum 100Y by the exposure device 101Y.

The number of rising edges of pulses input from the drum rotary encoder 7Y is counted from the start of exposure by the exposure device 101Y. As described hereinabove, each rising edge of the signal (pulse signal) output from the drum rotary encoder 7 corresponds to the slit-to-slit distance 2πR/800, and hence the distance can be counted by counting the edges. Since the distance is counted, even when a speed variation is caused during counting, in spite of variation in the time interval between the rising edges, the number of edges to be counted up to the target position is not varied. Note that the control unit 2 counts the number of rising edges of input pulses using the average value $T_{ENCAVE}$ calculated as described above, as the pulse edge input timing from the drum rotary encoder 7. The averaging of values input from the two photosensors provides an advantageous effect of reducing influence of errors in the disposition of the photosensors and slits.

The distance L from the exposure light irradiated position where each photosensitive drum 100 is irradiated with exposure light by each exposure device 101 to the primary transfer position where an image is transferred onto the intermediate transfer member 108 is measured in advance, and further, the distance D between the photosensitive drums 100 is also measured in advance as shown in FIG. 16.

A target count value $N_Y$ indicative of the number of rising edges of input pulses from the drum rotary encoder 7Y to be counted from the timing of starting exposure by the exposure device 101Y of the photosensitive drum until the timing of starting counting of the number of rising edges of input pulses from the intermediate transfer member rotary encoder 87 is determined by the following equation (6), and target count values $N_M$, $N_C$, and $N_K$ indicative of the numbers of rising edges of input pulses from the intermediate transfer member rotary encoder 87 to be counted from the timing of starting counting of the same to the timing of starting exposure by the exposure devices 101M, 101C, and 101K of the respective photosensitive drums 100M, 100C, and 100K are determined by the following equations (7), (8), and (9):

$$N_Y = L_Y \div \frac{2\pi R_Y}{800} \quad (6)$$

$$N_M = D_{YM} \div \frac{2\pi R_{ITB}}{800} - L_M \div \frac{2\pi R_M}{800} \quad (7)$$

$$N_C = D_{YC} \div \frac{2\pi R_{ITB}}{800} - L_C \div \frac{2\pi R_C}{800} \quad (8)$$

$$N_K = D_{YK} \div \frac{2\pi R_{ITB}}{800} - L_K \div \frac{2\pi R_K}{800} \quad (9)$$

Symbols in the above equations represent the following:
$R_Y$: radius of the photosensitive drum 100Y
$R_M$: radius of the photosensitive drum 100M
$R_C$: radius of the photosensitive drum 100C
$R_K$: radius of the photosensitive drum 100K
$R_{ITB}$: radius of the intermediate transfer member-driving roller 110

$L_Y$: distance from the exposure light irradiated position to the primary transfer position of the photosensitive drum 100Y
$L_M$: distance from the exposure light irradiated position to the primary transfer position of the photosensitive drum 100M
$L_C$: distance from the exposure light irradiated position to the primary transfer position of the photosensitive drum 100C
$L_K$: distance from the exposure light irradiated position to the primary transfer position of the photosensitive drum 100K
$D_{YM}$: distance between the primary transfer positions of the photosensitive drums 100Y and 100M
$D_{YC}$: distance between the primary transfer positions of the photosensitive drums 100Y and 100C
$D_{YK}$: distance between the primary transfer positions on the photosensitive drums 100Y and 100K The target values determined by these equations are stored in the ROM 14 in advance. The CPU 13 starts to count pulses (rising edges thereof) input from the intermediate transfer member rotary encoder 87 at a time point when the count value of rising edges of respective input pulses from the drum rotary encoder 7Y becomes equal to $N_Y$.

When the count value of rising edges of respective input pulses from the intermediate transfer member rotary encoder 87 becomes equal to $N_M$, the exposure device 101M starts exposure of the photosensitive drum 100M, when the count value of rising edges of respective input pulses from the intermediate transfer member rotary encoder 87 becomes equal to $N_C$, the exposure device 101C starts exposure of the photosensitive drum 100C, and when the count value of rising edges of respective input pulses from the intermediate transfer member rotary encoder 87 becomes equal to N, the exposure device 101K starts exposure of the photosensitive drum 100K.

That is, the ROM 14 stores in advance a first target value which is a value calculated, as expressed by the above equation (6), by multiplying the first distance $L_Y$ of the reference image bearing member (photosensitive drum 100Y) by the number (800) of pulses to be output from the image bearing member rotary encoder for one revolution, and dividing the resulting multiplication product by the circumference (2πR) of the image bearing member. The timing of starting counting the number of input pulses (rising edges thereof) from the intermediate rotary encoder 87 is a timing at which the number of pulses output from the image bearing member rotary encoder, which is counted by a count unit, becomes equal to the first target value $N_Y$.

Further, the ROM 14 stores in advance second target values which are values calculated, as expressed by the above equations (7), (8), and (9), by subtracting values calculated by multiplying the first distances ($L_M$, $L_C$, $L_K$) by the number (800) of pulses to be output from the associated image bearing member rotary encoders for one revolution and dividing the resulting multiplication products by the circumference (2πR) of each image bearing member, from values calculated by multiplying the second distances ($D_{YM}$, $D_{YC}$, $D_{YK}$) associated with the image bearing members (photosensitive drums 100M, 100C, 100K) other than the reference image bearing member (photosensitive drum 100Y) by the number (800) of pulses to be output from the intermediate transfer member rotary encoder for one revolution and dividing the resulting multiplication products by the circumference (2πR) of a rotating member (intermediate transfer member-driving roller 110), respectively. Further, timings at which the exposure units (exposure devices 101M, 101C, 101K) associated with the image bearing members (photosensitive drums 100M, 100C, 100K) other than the reference image bearing member (photosensitive drum 100Y) perform exposure of the associated image bearing members, respectively, are respective timings at which the count value of pulses output from the intermediate transfer member rotary encoder from the start of transfer of an image from the reference bearing member to the intermediate transfer member becomes equal to the associated second target values ($N_M$, $N_C$, $N_K$), respectively.

In the present embodiment, as is clear from the above, the drum rotary encoder 7 which outputs pulses to be actually counted during the control is the drum rotary encoder 7Y of the photosensitive drum 100Y. That is, the count unit counts the input pulses from the drum rotary encoder 7Y from the start of exposure by the exposure device 101Y of the photosensitive drum 100Y until the start of transfer of a Y-image formed by the exposure to the intermediate transfer member 108.

After the Y-image started to be transferred onto the intermediate transfer member 108, input pulses from the intermediate transfer member rotary encoder 87 of the intermediate transfer member-driving roller 110 are counted until the transferred image is conveyed to respective positions advanced from the primary transfer position of the Y-image, by respective distances calculated by subtracting distances between the exposure light irradiated positions and primary transfer positions of the respective photosensitive drums 100 other than the photosensitive drum 100Y, from distances between the primary transfer position of the Y-image and the primary transfer positions of the photosensitive drums 100 other than the photosensitive drum 100Y.

This is because a case is expected where even when the friction driving is performed, timings of detection by the drum rotary encoders 7 of the photosensitive drums 100 and the intermediate transfer member rotary encoder 87 do not completely coincide with each other due to differences in friction coefficient between the photosensitive drums 100 and the intermediate transfer member 108, differences in load between the photosensitive drums 100, and differences in the amount of assist torque set for each photosensitive drum. To cope with this, by using the Y-image as a reference image, the timings of exposure light irradiation of the respective colors are caused to be made uniform according to respective distances over which the reference image is moved. Therefore, in a case where the photosensitive drums 100 are completely friction-driven by the intermediate transfer member 108, any rotary encoder may be used for counting pulses.

Further, although in the present embodiment, the description has been given of a case where the distance from the exposure light irradiated position to the primary transfer position of the photosensitive drum 100M is shorter than the distance between the primary transfer positions of the photosensitive drums 100Y and 100M, if the former is longer than the latter, the exposure device 101M is caused to start exposure at a time point when the leading edge of the Y-image is on the photosensitive drum 100Y. Therefore, in this case, differently from the above, counting has to be started before the leading edge of the Y-image reaches the primary transfer position of the photosensitive drum 100Y, and hence the photosensitive drum 100M is required to start counting a target count in synchronism with the start of exposure for the Y-image, and the value of the target count to be counted is a value calculated by subtracting the difference between a count value corresponding to the distance $D_{YM}$ and a count value corresponding to the distance $L_M$ from the count value $N_Y$ corresponding to the distance $L_Y$. To ensure even higher accuracy, it is preferable to select a rotary encoder having a higher resolution.

According to the above-described exposure control, the sub scanning image writing positions on the intermediate transfer member 108 are made uniform such that the position of the transferred image on the intermediate transfer member 108 and the position of the image to be transferred from each of the photosensitive drums other than the photosensitive drum 100Y are aligned. Further, as described in the exposure control, the image writing position interval in the sub scanning direction of each color is always constant even when speed variation of each of the photosensitive drums 100 occurs. Therefore, it is possible to prevent occurrence of color shift in the images transferred onto the intermediate transfer member 108, which suppresses occurrence of color shift in the resulting image transferred onto a recording sheet.

Figure 18:
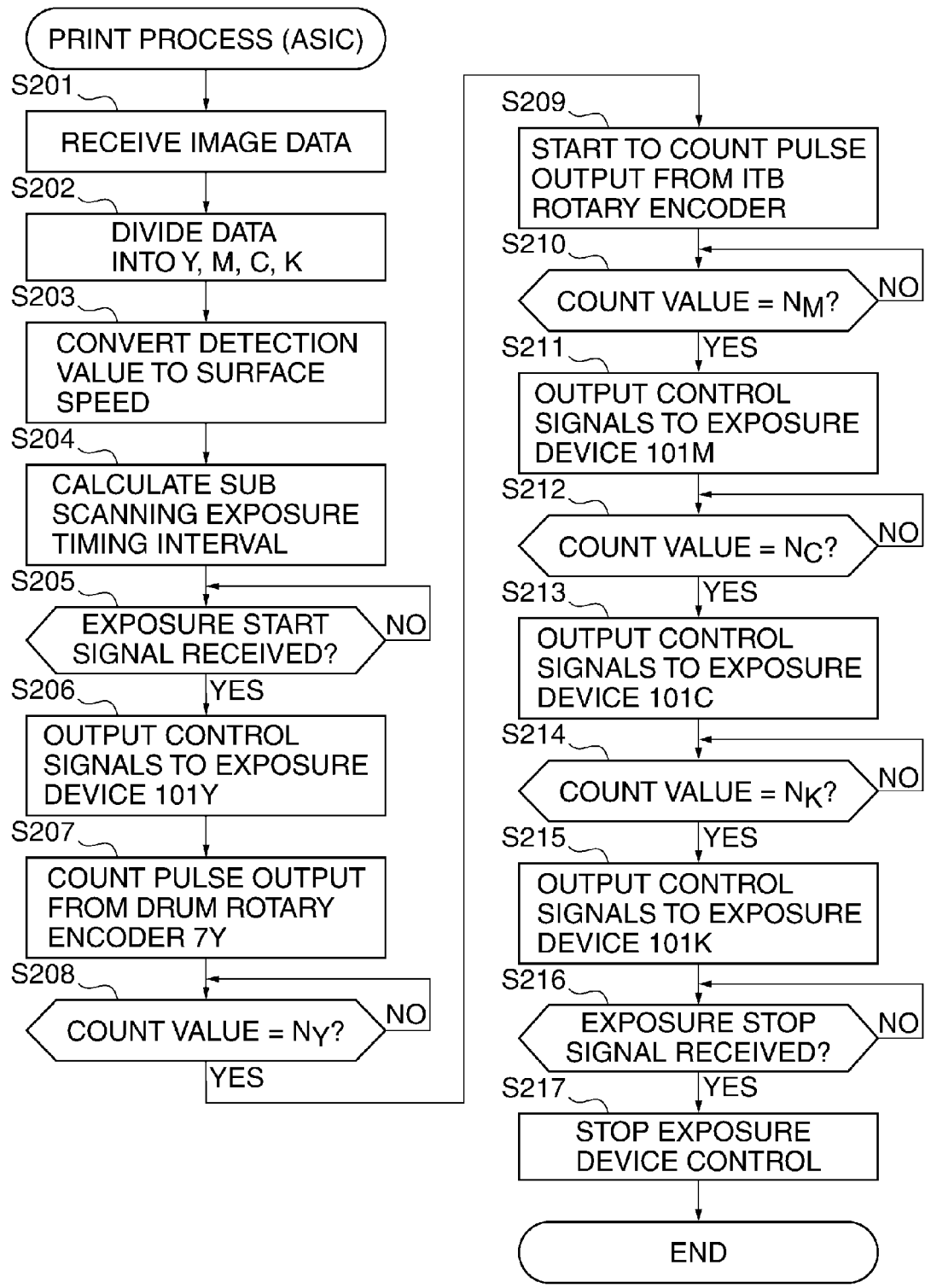
FIG. 18 is a flowchart of a print process executed by the control unit appearing in FIG. 5.

FIG. 18 is a flowchart of a print process executed by the control unit 2 appearing in FIG. 5.

Referring to FIG. 18, when the controller 60 receives a print operation command, the controller 60 outputs a command signal for starting various process controls to the host CPU 1. At the same time, image data is input from the controller 60 to the control unit 2 (step S201).

The control unit 2 decomposes the image data into information items of the respective colors of Y, M, C, and K for controlling the associated exposure devices 101 (step S202).

Then, the control unit 2 converts the detection value output from each of the drum rotary encoders 7 to the surface speed $V_S$ by using the equation (4) for each color (step S203). Then, the control unit 2 calculates the sub scanning exposure timing interval $\Delta t$ based on the target scanning direction pitch distance $\Delta L$ and the surface speed $V_S$ by the equation (5) for each color (step S204). In this process, the calculated sub scanning exposure timing interval $\Delta t$ is updated by the control unit 2 whenever image data is input from the controller 60.

When the control unit 2 receives an exposure start signal from the host CPU 1 (YES to a step S205), the control unit 2 outputs a $\Delta$CLK signal and a PWM signal to the exposure device 101Y as the control signals (step S206). The subsequent sub scanning exposure timing is determined according to the sub scanning exposure timing interval $\Delta t$.

Then, the control unit 2 counts each pulse of the signal output from the drum rotary encoder 7Y whenever the rising edge thereof is detected (step S207).

When the count value of pulses of the signal output from the drum rotary encoder 7Y becomes equal to the target count value $N_Y$ calculated by the equation (6) (YES to a step S208), the control unit 2 starts to count each pulse of the signal output from the intermediate transfer member rotary encoder 87 whenever the rising edge of the pulse is detected (step S209).

When the count value of pulses output from the intermediate transfer member rotary encoder 87 becomes equal to the target count value $N_M$ calculated by the equation (7) (YES to a step S210), the control unit 2 outputs a $\Delta$CLK signal and a PWM signal too the exposure device 101M as the control signals (step S211). The subsequent sub scanning exposure timing is determined according to the sub scanning exposure timing interval $\Delta t$.

When the count value of pulses of the signal output from the intermediate transfer member rotary encoder 87 becomes equal to the target count value $N_C$ calculated by the equation (8) (YES to a step S212), the control unit 2 outputs a $\Delta$CLK signal and a PWM signal to the exposure device 101C as the control signals (step S213). The subsequent sub scanning exposure timing is determined according to the sub scanning exposure timing interval $\Delta t$.

When the count value of pulses of the signal from the intermediate transfer member rotary encoder 87 becomes equal to the target count value $N_K$ calculated by the equation (9) (YES to a step S214), the control unit 2 outputs a $\Delta$CLK signal and a PWM signal to the exposure device 101K as the control signals (step S215). The subsequent sub scanning exposure timing is determined according to the sub scanning exposure timing interval Δt.

When the control unit 2 receives an exposure stop signal from the host CPU 1 (YES to a step S216), the control unit 2 stops controlling the exposure devices 101 (step S217), followed by terminating the present process. According to the above-described process, it is possible to transfer images from the photosensitive drums 100 onto the intermediate transfer member 108 without color shift.

As described above, in the present embodiment, the timing in which each exposure unit exposes an associated one of the image bearing members is controlled based on the first distance from a position where the image bearing member is exposed by the exposure unit to a position where the image is transferred onto the intermediate transfer member, the second distance between the primary transfer position of the reference image bearing member as a predetermined reference and that of each of the other image bearing members, and the number of pulses counted by the count unit.

Figure 19:
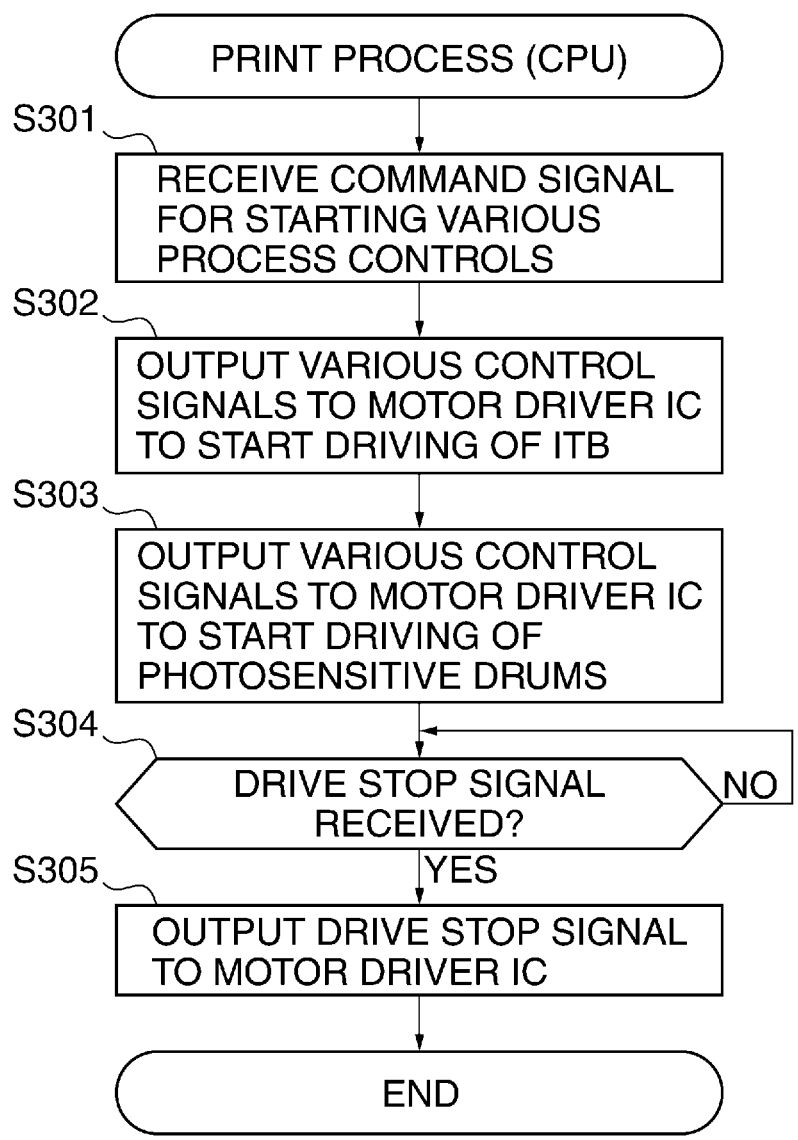
FIG. 19 is a flowchart of a print process executed by the CPU appearing in FIG. 4.

FIG. 19 is a flowchart of a print process executed by the CPU 13 appearing in FIG. 4.

Referring to FIG. 19, the CPU 13 receives a command signal for starting the various process controls from the host CPU 1 (step S301). Next, the CUP 13 calculates an angular speed of the intermediate transfer member-driving roller 110 based on the detection value input from the intermediate transfer member rotary encoder 87, outputs the various control signals to the intermediate transfer member motor driver IC 88 to start driving of the intermediate transfer member 108, and feedback-controls the angular speed of the intermediate transfer member-driving roller 110 (step S302).

Further, the CPU 13 outputs the various control signals to the drum motor driver IC 3 to start driving of the photosensitive drums 100 according to the fixed PWM value stored in the RAM 15, which has been determined according to the assist torque-calculating sequence (step S303).

When it is determined in a step S304 that the CPU 13 has received a drive stop signal from the host CPU 1 (YES to the step S304), the CPU 13 outputs drive stop signals to the drum motor driver IC 3 and the intermediate transfer member motor driver IC 88 to stop driving the photosensitive drums 100 and the intermediate transfer member 108 (step S305), followed by terminating the present process.

In the above-described embodiment, it is assumed that the distance L from the exposure position to the primary transfer position of each photosensitive drum 100 is fixed, but the distance L sometimes changes.

This change is caused e.g. in a case where the photosensitive drum 100 is not uniform or fixed in radius, or a case where the drum shaft 9 is off-centered.

In this case, it is necessary to correct the equation (4) for calculating the surface speed, which is based on the assumption that the radius R is uniform or fixed. If a value of the radius of each of the photosensitive drums 100 at each of surface positions on all of the photosensitive drums 100 can be known, the above-mentioned correction can be performed based on the known value.

To this end, in a variation of the first embodiment described hereafter, the radius of each photosensitive drum 100 is measured in advance, or is measured on an as-needed basis. Further, a mechanism for detecting a specific surface position is preferably employed. As a method of detecting a specific surface position, to begin with, the surface of each photosensitive drum 100 is divided into areas corresponding in number to the slits 7e of the rotary encoder and each area is associated with each slit 7e.

To grasp which area is associated with a pulse detected by each slit 7e, a pulse detected at the slit 7f is set as a home position pulse. More specifically, by using the rising edge of the pulse detected at the slit 7f as a reference, the pulse detected at each slit 7e thereafter is counted whenever the rising edge thereof is detected.

In a case where the number of slits is 800, the circumferential length 2πR of each photosensitive drum 100 is divided into 800 portions, and assuming that a radius corresponding to a surface area associated with the number n of a counted pulse is R(n), the equation (4) is corrected to the following equation (10):

$$V_S = \frac{2\pi \times R(n)}{800} \div T_{ENCAVE} \qquad (10)$$

wherein n represents a pulse number of a pulse output from the drum rotary encoder 7, which is numbered starting from the home position pulse.

As for the start timing of the exposure control of each of the colors, N in the equations (6), (7), (8), and (9) represents a count target value of pulses to be counted by a rotary encoder (intermediate transfer member rotary encoder 87), which is calculated using a value calculated by dividing a specific fixed distance by a surface movement distance corresponding to one slit of a rotary encoder (drum rotary encoder 7).

However, in a case where the radius of the photosensitive drum 100 is different between the surface positions, the surface movement distance corresponding to one slit of the rotary encoder is not fixed, and hence the count target value cannot be calculated beforehand.

Therefore, it is necessary to make the exposure start timing uniform by calculating the surface movement distance each time and determining whether or not the calculated surface movement distance becomes the target distance. The distance L from the exposure light irradiated position to the primary transfer position of the photosensitive drum 100 varies with the number n of pulses counted from the home position pulse, and hence the distance L becomes a value determined according to the value of n.

On the other hand, a drum-to-drum distance D (i.e. distance between primary transfer positions of respective photosensitive drums 100) does not change unless any of the photosensitive drum 100 is displaced, and hence the drum-to-drum distance D is set to a fixed value. Although the calculation is performed by setting the drum-to-drum distance D to a fixed value in this example, if the drum-to-drum distance D varies, by additionally calculating a variation of the drum-to-drum distance D, the above calculation can be similarly performed.

Figure 20:
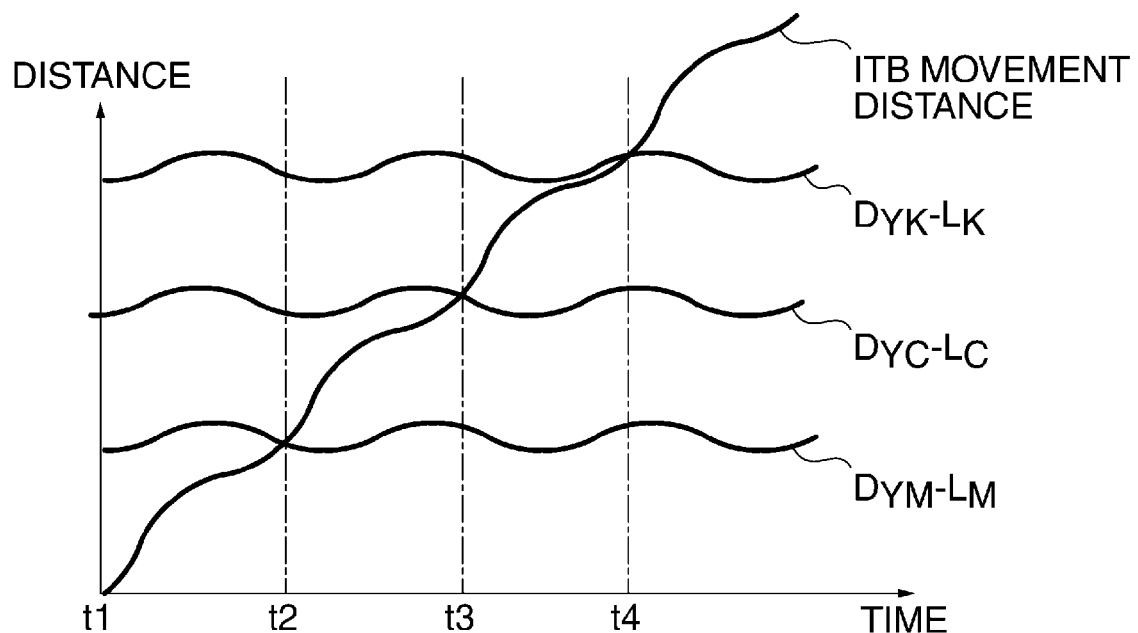
FIG. 20 is a diagram useful in explaining control for causing the start timing of exposure control to be adjusted to be uniform between respective colors.

FIG. 20 is a diagram useful in explaining control for causing the start timing of exposure control to be adjusted to be uniform between the respective colors.

Referring to FIG. 20, the vertical axis represents distance, and the horizontal axis represents time. Further, although the same symbols as used in the equations (6), (7), (8), and (9) are used, in the present case, $L_Y$, $L_M$, $L_C$, and $L_K$ are not constants but variables.

Therefore, in the graph, the curves $D_{YM}$-$L_M$, $D_{YC}$-$L_C$, and $D_{YK}$-$L_K$ each form a fluctuating curve. Further, a curve indicating the movement distance of the intermediate transfer member 108 which friction-drives the photosensitive drums 100 has a similar form.

Therefore, first, a distance from the exposure light irradiated position to the primary transfer position determined based on the radius of the photosensitive drum 100 in a case where the drum shaft 9 is not off-centered is set to $L_Y$, and the number of a pulse output from the drum rotary encoder 7Y when the exposure start signal is input is set to $n_Y$.

Then, the movement distance at $n_Y$, the movement distance at $n_Y+1$, and so on, are sequentially added to thereby calculate a total of the movement distances.

$$\Delta L_Y = L_Y - \sum_{n=n_Y}^{N_Y} \frac{2\pi \times R_Y(n)}{800} \qquad (11)$$

The value of $N_Y$ in the equation (11) represents the number of pulses at which $\Delta L_Y$ obtained by subtracting the total of the movement distances from $L_Y$ becomes equal to 0. Therefore, the movement distance of the intermediate transfer member starts to be calculated according to detection of the rising edge of each pulse from the intermediate transfer member rotary encoder 87 at a time point $t_1$ at which the number of pulses output from the drum rotary encoder 7Y counted from the start of exposure becomes equal to $N_Y$.

The surface movement distance of the photosensitive drum 100M is calculated according to detection of the rising edge of each pulse from the drum rotary encoder 7M, the surface movement distance of the photosensitive drum 100C is calculated according to detection of the rising edge of each pulse from the drum rotary encoder 7C, and the surface movement distance of the photosensitive drum 100K is calculated according to detection of the rising edge of each pulse from the drum rotary encoder 7K.

$$\Delta L_M = \left(D_{YM} - \sum \frac{2\pi \times R_M(n)}{800}\right) - \sum_{n=n_{ITB}} \frac{2\pi \times R_{ITB}(n)}{800} \qquad (12)$$

As expressed by the equation (12), a value obtained by subtracting a distance over which the photosensitive drum 100M (strictly, a leading edge of an M-image formed thereon) has moved from the exposure light irradiated position to the primary transfer position, which is calculated each time, from the distance $D_{YM}$ between the respective primary transfer positions of the photosensitive drums 100Y and 100M is set as an exposure timing target distance of the photosensitive drum 100M.

Further, the number of a pulse to be output from the intermediate transfer member rotary encoder 87 at the time point $t_1$ is set to $n_{ITB}$, and a total movement distance over which the intermediate transfer member 108 has moved after the time point $t_1$ is calculated by adding up a movement distance of the intermediate transfer member 108 calculated each time.

At a time point $t_2$ at which $\Delta L_M$ which is calculated, as expressed by the equation (12), by subtracting the total movement distance of the intermediate transfer member 108 from the exposure timing target distance becomes equal to 0, the exposure device 101M starts to expose the photosensitive drum 100M.

$$\Delta L_C = \left(D_{YC} - \sum \frac{2\pi \times R_C(n)}{800}\right) - \sum_{n=n_{ITB}} \frac{2\pi \times R_{ITB}(n)}{800} \qquad (13)$$

As expressed by the equation (13), a value obtained by subtracting a distance over which the photosensitive drum 100C (strictly, a leading edge of a C-image formed thereon) has moved from the exposure light irradiated position to the primary transfer position, which is calculated each time, from the distance $D_{YC}$ between the respective primary transfer positions of the photosensitive drums 100Y and 100C is set as an exposure timing target distance of the photosensitive drum 100C.

At a time point $t_3$ at which $\Delta L_C$ which is calculated, as expressed by the equation (13), by subtracting the total movement distance of the intermediate transfer member 108 from the exposure timing target distance becomes equal to 0, the exposure device 101C starts to expose the photosensitive drum 100C.

$$\Delta L_K = \left(D_{YK} - \sum \frac{2\pi \times R_K(n)}{800}\right) - \sum_{n=n_{ITB}} \frac{2\pi \times R_{ITB}(n)}{800} \qquad (14)$$

As expressed by the equation (14), a value obtained by subtracting a distance over which the photosensitive drum 100K (strictly, a leading edge of a K image formed thereon) has moved from the exposure light irradiated position to the primary transfer position, which is calculated each time, from the distance $D_{YK}$ between the respective primary transfer positions of the photosensitive drums 100Y and 100K is set as an exposure timing target distance of the photosensitive drum 100K.

At a time point $t_4$ at which $\Delta L_K$ which is calculated, as expressed by the equation (14), by subtracting the total movement distance of the intermediate transfer member 108 from the exposure timing target distance becomes equal to 0, the exposure device 101K starts to expose the photosensitive drum 100K.

The above-mentioned $R_Y(n)$, $R_M(n)$, $R_C(n)$, and $R_K(n)$ are stored in the ROM 14 in advance. These values are first physical amounts for determining the surface movement distance of the image bearing member according to each pulse output from the image bearing member rotary encoder.

As expressed by the equation (11), whenever the image bearing member rotary encoder outputs a pulse, a value is calculated by multiplying the first physical amount $R_Y(n)$ associated with the output pulse by (the circumference ratio× 2) and dividing the multiplication product by the number (800) of pluses to be output from the image bearing member rotary encoder for one revolution, and each value thus calculated is sequentially subtracted from the first distance. When the value resulting from the subtraction becomes equal to 0, the movement distance of the intermediate transfer member starts to be calculated according to detection of the rising edge of each pulse from the intermediate transfer member rotary encoder.

Further, the value of $R_{ITB}(n)$ is stored in the ROM 14 in advance. This is a second physical amount for determining the surface movement distance of the intermediate transfer member for each pulse output from the intermediate transfer member rotary encoder.

As expressed by the equations (12), (13), and (14), from a value calculated by subtracting a value calculated by multiplying each of the respective totals of the first physical amounts ($\Sigma R_M(n)$, $\Sigma R_C(n)$, $\Sigma R_K(n)$) by (the circumference ratio×2) and dividing the multiplication product by the number (800) of pluses to be output from the image bearing member rotary encoder for one revolution, from an associated one of the second distances ($D_{YM}$, $D_{YC}$, $D_{YK}$) of the image bearing members, there is subtracted, whenever the intermediate transfer member rotary encoder outputs a pulse, a value calculated by multiplying the second physical amount $R_{ITB}$ (n) corresponding to the output pulse by (the circumference ratio×2) and dividing the multiplication product by the number (800) of pluses to be output from the intermediate transfer member rotary encoder for one revolution. When the value resulting from the subtraction becomes equal to 0, the exposure unit associated with each associated image bearing member other than the reference image bearing member starts to expose the image bearing member.

As described above, in the present embodiment, by using the method of shifting the electrostatic latent image formation start timing between the drums, based on the distance from the exposure light irradiated position to the primary transfer position of each drum and each primary transfer position-to-primary transfer position distance, it is possible to prevent occurrence of color shift in images transferred from the plurality of image bearing members onto the intermediate transfer member. This makes it possible to prevent occurrence of color shift in the resulting image transferred onto a recording sheet.

Next, a description will be given of a second embodiment of the present invention. The present embodiment differs from the first embodiment in the method of controlling exposure in the sub scanning direction in each of the photosensitive drums 100, more particularly, the method of calculating the sub scanning exposure timing. The hardware configuration according to the present embodiment is the same as that according to the first embodiment, and hence component elements corresponding to those in the first embodiment are denoted by the same reference numerals, and description thereof is omitted. The exposure control in the sub scanning direction is performed in a manner synchronized with detection of each pulse from the drum rotary encoder 7, similarly to the first embodiment. Further, similarly to the first embodiment, the image forming apparatus, denoted by reference numeral 1000, is configured to form image data of 600 dpi on a recording sheet, and because of the resolution of 600 dpi, a distance between lines in the sub scanning direction is approximately 42.3 µm (hereinafter referred to as "ΔL"), which is calculated by dividing 2.54 cm by 600.

The value ΔL is defined first as a target pitch distance of the line-to-line distance in the sub scanning direction. Further, the surface movement distance of the photosensitive drum 100 is always measured, and the sub scanning exposure timing is determined by the sub scanning exposure timing interval Δt which is a time period to be taken to move over the line-to-line distance ΔL. After the sub scanning exposure timing, the surface movement distance is measured from 0 again for calculation of the next sub scanning exposure timing. In general, a distance from the rotational axis to the surface of each photosensitive drum 100 is different depending on the position on the surface. Therefore, the value of the sub scanning exposure timing interval Δt is different depending on the position on the surface of the photosensitive drum 100. The method of measuring the surface movement distance of the photosensitive drum 100 will be described hereinafter.

The control unit 2 performs processing using calculation timing of the average value $T_{ENC_{AVE}}$ calculated by the method as described in the first embodiment, as the pulse edge input timing from the drum rotary encoder 7. By averaging values input from the two photosensors, the advantageous effect of reducing influence of errors in the disposition of the photosensors and slits is provided as mentioned hereinabove.

The control unit 2 calculates exposure position information of each photosensitive drum 100 based on the pulse edge input timing from the drum rotary encoder 7 and the pulse edge input timing from the photosensor 7d.

More specifically, a pulse edge first input from the drum rotary encoder 7 after a pulse edge is input from the photosensor 7d is set as a first pulse edge, and a pulse edge input next from the drum rotary encoder 7 is set as a second pulse edge. Thereafter, whenever a pulse edge is input from the drum rotary encoder 7, a number, updated each time, is assigned to the pulse edge input.

As described above, by assigning an identification number to all input pulse edges from the drum rotary encoder 7, it is possible to identify which position on the photosensitive drum 100 is exposed.

FIG. 21A is a diagram showing a surface distance $z_n$ of the photosensitive drum 100, associated with the encoder pulse number n, and FIG. 21B is a diagram showing a radius $r_n$ of the photosensitive drum 100, associated with the encoder pulse number n.

A table shown in FIG. 21A indicates that the surface of each photosensitive drum 100 moves by the surface distance $z_n$ from the input of an n-th (1≤n<800) pulse edge to the input of a n+1-th pulse edge. That is, assuming that a slit causing an n-th pulse edge to be generated is a slit n, the table indicates a surface distance of the photosensitive drum 100 associated with the n-th pulse edge or the slit n.

For example, the table shows that the surface of the photosensitive drum 100 moves by the surface distance 118.81 µm from the input of the first pulse edge to the input of the second pulse edge.

Therefore, by adding up surface distances shown in FIG. 21A whenever each associated pulse edge is input, it is possible to calculate a movement distance between desired timings.

A table shown in FIG. 21B indicates a distance from the rotational axis to the surface of a photosensitive drum 100 when an n-th (1≤n≤800) pulse edge is input.

For example, the distance from the rotational axis to the surface of the photosensitive drum 100 when a first pulse edge is input is 15127.32 µm.

The surface distance shown in FIG. 21A and the radius shown in FIG. 21B have a relationship expressed by the following equation (15):

$$Z_n = \frac{2\pi r_n}{E} \quad (15)$$

wherein E represents the number of pulses to be output from the drum rotary encoder during one revolution of the photosensitive drum 100.

As described above, by determining one of the surface distance and the radius, the other is uniquely determined. Therefore, one of the surface distance and the radius, which is the easier to measure, may be measured for the image forming apparatus to be controlled. In the present embodiment, the measurement using the surface distance will be described. Further, not only the radius but also any value that enables determination of the surface distance can be practically regarded as the surface distance. Note that information indicating the table shown in FIG. 21A or 21B is stored in the ROM 14 in advance.

Similarly to FIG. 16 in the first embodiment, L represents the distance from the exposure light irradiated position to the primary transfer position of each photosensitive drum 100, i.e., $L_Y$ represents the distance from the exposure light irradiated position to the primary transfer position of the photosensitive drum 100Y, $L_M$ the distance from the exposure light irradiated position to the primary transfer position of the photosensitive drum 100M, $L_C$ the distance from the exposure light irradiated position to the primary transfer position of the photosensitive drum 100C, and $L_K$ the distance from the exposure light irradiated position to the primary transfer position of the photosensitive drum 100K. Further, D represents the respective distances from the photosensitive drum 100Y (first image bearing member) to the other photosensitive drums 100M, 100C, and 100K (second image bearing members), i.e., $D_{YM}$ represents the distance from the photosensitive drum 100Y to the photosensitive drum 100M, $D_{YC}$ the distance from the photosensitive drum 100Y to the photosensitive drum 100C, and $D_{YK}$ the distance from the photosensitive drum 100Y and the photosensitive drum 100K.

The drum-to-drum distance D (i.e. distance between primary transfer positions of respective photosensitive drums 100) does not change unless any of the photosensitive drum 100 is displaced, and hence the drum-to-drum distance D is set to a fixed value. However, but in the calculation described hereafter, if the drum-to-drum distance D varies, it is possible to perform the calculation by calculating a varying distance of the drum-to-drum distance D, as mentioned hereinabove in the first embodiment.

In general, the distance from the center of the rotational axis to the drum surface of each photosensitive drum 100 is not fixed e.g. due to variation in accuracy of molding of the photosensitive drums 100 and off-centering of the drum shaft 9. Therefore, the distance L from the exposure light irradiated position to the primary transfer position of the photosensitive drum 100 is different between the photosensitive drums 100, and between the surface positions.

FIG. 22 is a diagram useful in explaining control for causing the start timing of exposure control to be adjusted to be uniform between the respective colors.

Referring to FIG. 22, the vertical axis represents distance, and the horizontal axis represents time. The distances $L_Y$, $L_M$, $L_C$, and $L_K$ are variables that vary at a repetition period of one revolution of each drum. Therefore, in the graph, the curves of $L_Y$, $L_M$, $L_C$, and $L_K$ each form a sinusoidal curve having periodicity. However, the photosensitive drums 100 do not have entirely the same shape and hence can be different in period, phase, and amplitude.

A dynamic variation in the curve $L_Y$ with time indicates that the distance from the exposure light irradiated position to the primary transfer position of the photosensitive drum 100Y dynamically varies with time.

Further, dynamic variations in curves $L_M$, $L_C$, and $L_K$ with time indicate that the respective distances from the exposure light irradiated positions to the primary transfer positions of the photosensitive drums 100M, 100C, and 100K on the photosensitive drums 100M, 100C, and 100K dynamically vary.

Therefore, to align the leading edges of the images to be transferred from the respective photosensitive drums, it is necessary to adjust the exposure timing between the respective colors according to $L_Y$, $L_M$, $L_C$, and $L_K$, which dynamically vary.

Hereafter, a method of adjusting the exposure timing between the colors will be described.

The image formation for the respective colors will be described. First, when the CPU 13 receives an image formation start signal from the host CPU 1, the CPU 13 starts exposure of the photosensitive drum 100Y by the exposure device 101Y. At the same time, the CPU 13 calculates the distance $L_Y$.

Further, after the start of exposure by the exposure device 101Y, the CPU 13 continues to calculate the distances $L_M$, $L_C$, and $L_K$ from the respective exposure light irradiated positions to the primary transfer positions of the photosensitive drums 100.

Figure 23:
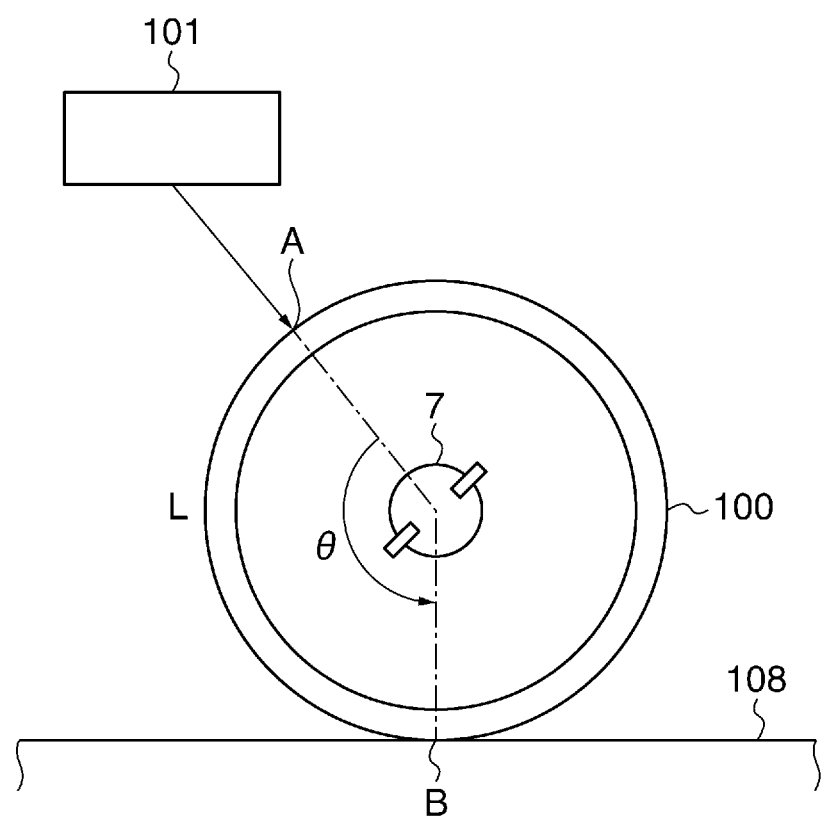
FIG. 23 is a diagram useful in explaining a method of calculating the distance from the exposure light irradiated position to the primary transfer position on the photosensitive drum.

FIG. 23 is a diagram useful in explaining a method of calculating each distance L.

Referring to FIG. 23, an angle θ formed by the exposure light irradiated position, denoted by A, and the first transfer position, denoted by B, on the drum rotary encoder 7 is indicated. The angle θ is a design value and hence is a predetermined fixed value.

The slits 7e provided in the drum rotary encoder 7 (see FIG. 14) are arranged at equally-spaced intervals along the circumference. That is, when the number of slits is 800, a slit-to-slit interval can be expressed by 360÷800=0.45°. Further, the number of slits corresponding to the angle θ is a fixed value S.

For example, if θ=135°, the number of slits is S=135÷0.45=300. Note that in the present embodiment, the value θ is an identical design value for the photosensitive drums of respective colors. That is, the number S of slits is common to the photosensitive drums 100.

Therefore, assuming that the encoder pulse edge number at a certain timing is n, the distance L is a value obtained by adding up the surface distances $z_n$ corresponding to a range of the pulse edge number n to a pulse edge number n+S. Note that the encoder pulse edge number n depends on a rotational angle of each photosensitive drum 100, and hence is different between the photosensitive drums 100.

Further, the photosensitive drums 100 are different in shape between drum individuals, and hence the surface distances $L_Y$, $L_M$, $L_C$, and $L_K$ associated with the encoder pulse number n of the photosensitive drums 100 are also different between the photosensitive drums 100.

The CPU 13 continues to calculate, based on the pulse edge number at the start of exposure by the exposure device 101Y and pulse edges input thereafter, a distance over which the photosensitive drum 100Y has moved from the start of exposure. Even when the respective speeds of the photosensitive drums 100 and the intermediate transfer member 108 vary, only time intervals of inputting of the pulse edges vary but the number of pulse edges corresponding to the distance does not vary, and hence it is possible to accurately measure the movement distance regardless of the speed variation.

Then, the exposure device 101M starts exposure when the movement distance becomes equal to a target distance $TD_M$, which is calculated separately as described hereinafter, the exposure device 101C starts exposure when the movement distance becomes equal to a target distance $TD_C$, which is calculated separately as described hereinafter, and the exposure device 101K starts exposure when the movement distance becomes equal to a target distance $TD_K$, which is calculated separately as described hereinafter. The target distances $TD_M$, $TD_C$, and $TD_K$ are calculated by the following equations (16), (17), and (18):

$$TD_M = D_{YM} - L_M + L_y = D_{YM} - \sum_{n=w_m}^{w_m+S} Z_{Mn} + \sum_{n=w_y}^{w_y+S} Z_{Yn} \quad (16)$$

$$TD_C = D_{YC} - L_C + L_y = D_{YC} - \sum_{n=w_c}^{w_c+S} Z_{Cn} + \sum_{n=w_y}^{w_y+S} Z_{Yn} \quad (17)$$

$$TD_K = D_{YK} - L_K + L_y = D_{YK} - \sum_{n=w_k}^{w_k+S} Z_{Kn} + \sum_{n=w_y}^{w_y+S} Z_{Yn} \quad (18)$$

Symbols in the above equations represent the following:

n: encoder pulse number assigned to each slit for identification of the slit

S: the number of slits corresponding to an angle formed between circumferential positions of the drum rotary encoder respectively corresponding to the exposure light irradiated position and the primary transfer position of the photosensitive drum $w_y$: encoder pulse number associated with the photosensitive drum 100Y at a time when the exposure device 101Y starts exposure $w_m$: encoder pulse number associated with the photosensitive drum 100M at a certain timing $w_c$: encoder pulse number associated with the photosensitive drum 100C at a certain timing $w_k$: encoder pulse number associated with the photosensitive drum 100K at a certain timing $Z_{Yn}$: surface distance on the photosensitive drum 100Y associated with a slit n of the drum rotary encoder 7Y

$Z_{Mn}$: surface distance on the photosensitive drum 100M associated with a slit n of the drum rotary encoder 7M

$Z_{Cn}$: surface distance on the photosensitive drum 100C associated with a slit n of the drum rotary encoder 7C

$Z_{Kn}$: surface distance on the photosensitive drum 100K associated with a slit n of the drum rotary encoder 7K

$L_Y$: surface distance from the exposure light irradiated position to the primary transfer position of the photosensitive drum 100Y

$L_M$: surface distance from the exposure light irradiated position to the primary transfer position of the photosensitive drum 100M

$L_C$: surface distance from the exposure light irradiated position to the primary transfer position of the photosensitive drum 100C

$L_K$: surface distance from the exposure light irradiated position to the primary transfer position of the photosensitive drum 100K

$D_{YM}$: distance between the primary transfer positions of the photosensitive drums 100Y and 100M

$D_{YC}$: distance between the primary transfer positions of the photosensitive drums 100Y and 100C

$D_{YK}$: distance between the primary transfer positions of the photosensitive drums 100Y and 100K

The values of $Z_{Yn}$, $Z_{Mn}$, $Z_{Cn}$, $Z_{Kn}$, $D_{YM}$, $D_{YC}$, and $D_{YK}$ are stored in the ROM 14 in advance. The value of $L_Y$ is calculated by the CPU 13 when the image formation start signal is received, and the values of $L_M$, $L_C$, $L_K$, $TD_M$, $TD_C$, and $TD_K$ are calculated by the CPU 13 whenever an encoder pulse edge is input.

Further, the values of $D_{YM}$, $D_{YC}$, and $D_{YK}$ in the right sides of the respective equations (16), (17), and (18) represent distances from the primary transfer position of the photosensitive drum 100Y where the photosensitive drum 100Y is in contact with the intermediate transfer member 108 to the primary transfer positions of the photosensitive drums 100M, 100C, and 100K where the photosensitive drums 100M, 100C, and 100K are in contact with the intermediate transfer member 108, respectively.

Further, the summations (Σ) of $Z_{Mn}$, $Z_{Cn}$, and $Z_{Kn}$, correspond to second surface distances from the exposure light irradiated positions on the photosensitive drums 100M, 100C, and 100K where exposure by the exposure devices 101M, 101C, and 101K is performed, respectively, to the primary transfer positions of the photosensitive drums 100M, 100C, and 100K where the photosensitive drums 100M, 100C, and 100K are in contact with the intermediate transfer member 108, respectively, at a timing at which the exposure device 101Y starts to expose the photosensitive drum 100Y.

Further, the summation (Σ) of $Z_{Yn}$ corresponds to the first surface distance from the exposure light irradiated position on the photosensitive drum 100Y where exposure by the exposure device 101Y is performed, to the primary transfer position of the photosensitive drum 100Y where the photosensitive drum 100Y is in contact with the intermediate transfer member 108.

These summation values are calculated by the CPU 13, and the CPU 13 calculates the target distances $TD_M$, $TD_C$, and $TD_K$ by adding the first surface distance to the distances from the primary transfer position of the photosensitive drum 100Y where the photosensitive drum 100Y is in contact with the intermediate transfer member 108 to the primary transfer positions of the photosensitive drums 100M, 100C, and 100K where the photosensitive drums 100M, 1000C, and 100K are in contact with the intermediate transfer member 108, respectively, and further subtracting the respective second surface distances from the respective resulting sums.

Further, the CPU 13 controls the exposure devices 101M, 101C, and 101K such that they start to expose the photosensitive drums 100M, 1000C, and 100K when the surface movement distance of the photosensitive drum 100Y from the exposure light irradiated position where exposure on the photosensitive drum 100Y by the exposure device 101Y has been started becomes equal to the calculated target distance. Therefore, the CPU 13 corresponds to a first calculation unit, a second calculation unit, a target value calculation unit, and a control unit.

Further, the pulse-associated surface distances $Z_{Yn}$, $Z_{Mn}$, $Z_{Cn}$, and $Z_{Kn}$, over which the respective photosensitive drums 100 move when pulses output from the associated drum rotary encoders 7Y are input, respectively, are stored in association with each pulse number, in the ROM 14 which is a storage unit.

Then, as expressed by the equations (16), (17), and (18), the CPU 13 adds the pulse-associated surface distances $Z_{Yn}$, $Z_{Mn}$, $Z_{Cn}$, and $Z_{Kn}$, read out from the ROM 14, whenever a pulse is input to thereby calculate the first surface distance and the second surface distances.

Figure 24:
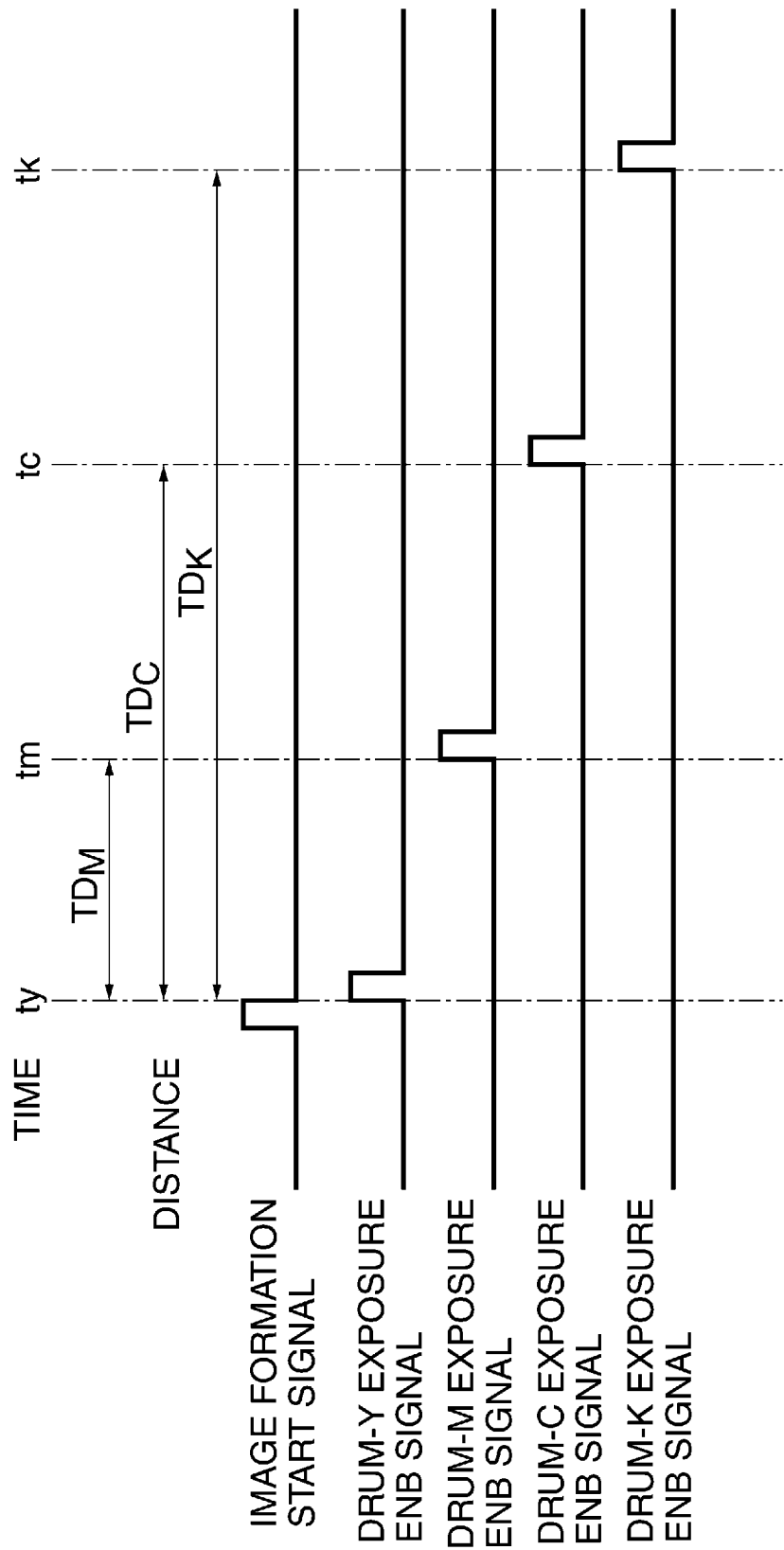
FIG. 24 is a timing diagram showing a relationship between an image formation start signal and exposure control start timing for starting exposure of each of the photosensitive drums of the respective colors.

FIG. 24 is a timing diagram showing a relationship between the image formation start signal and the exposure control start timing for starting exposure of the photosensitive drums of the respective colors.

A drum-Y exposure ENE signal is output at a time point ty immediately after the image formation start signal has been output, a drum-M exposure ENB signal is output at a time point tm, a drum-C exposure ENB signal is output at a time point tc, and a drum-K exposure ENB signal is output at a time point tk.

In this timing chart, the time point tm is a time when the photosensitive drum 100Y has moved by the target distance $TD_M$ after the image formation start signal has been input, the time point tc is a time when the photosensitive drum 100Y has moved by the target distance $TD_C$ after the image formation start signal has been input, and the time point tk is a time when the photosensitive drum 100Y has moved by the target distance $TD_K$ after the image formation start signal has been input.

In the present embodiment, the target distances $TD_M$, $TD_C$, and $TD_K$ for the photosensitive drums 100M, 100C, 100K after the start of exposure on the photosensitive drum 100Y are calculated using the drum rotary encoder 7Y provided on the photosensitive drum 100Y. However, when the photosensitive drums 100 of the respective colors are completely friction-driven by the intermediate transfer member 108, all the movement distances calculated for the photosensitive drums are always the same, and hence they may be calculated using another photosensitive drum 100 or the intermediate transfer member 108.

Figure 25A:
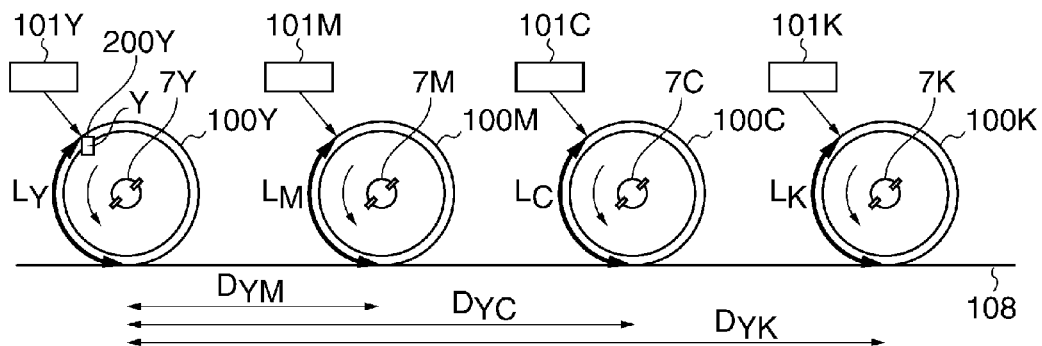
FIGS. 25A to 25C are diagrams showing image leading edge positions of the respective colors.
Figure 25B:
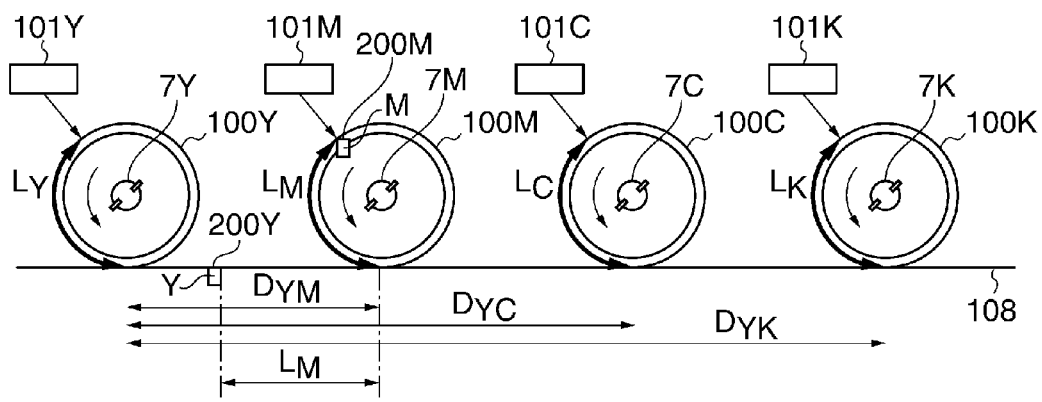
Figure 25C:
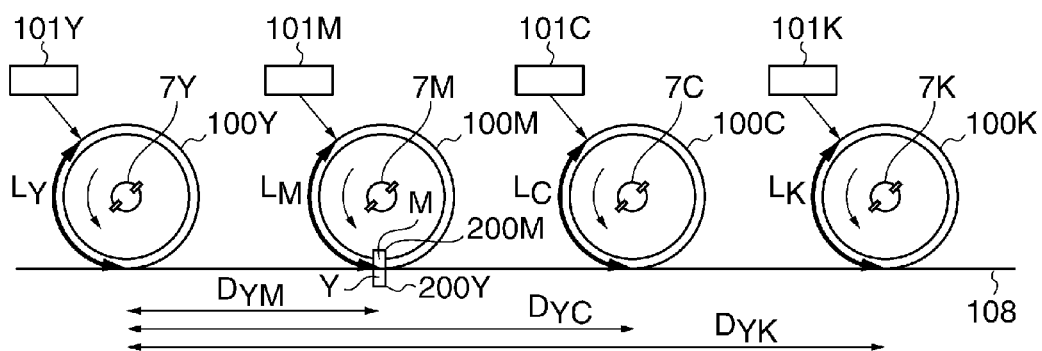

FIGS. 25A to 25C are diagrams showing image leading edge positions of the respective colors.

Referring to FIGS. 25A to 25C, a Y-image leading edge position is denoted by 200Y, and an M-image leading edge position is denoted by 200M.

FIG. 25A shows the image leading edge position at the time point ty immediately after the image formation start signal has been input. The Y-image leading edge position 200Y of a Y-image for which exposure is started upon receipt of the image formation start signal is at the exposure light irradiated position of the photosensitive drum 100Y. The M-image leading edge position, a C-image leading edge position, and a K-image leading edge position do not exist because the associated photosensitive drums are not exposed yet at this time.

FIG. 25B shows the image leading edge positions at a time point tm. The M-image leading edge position 200M of the M-image for which exposure is started in synchronism with the target distance TD being reached is at the exposure light irradiated position of the photosensitive drum 100M. Further, the Y-image leading edge position 200Y is on the intermediate transfer member 108.

At this time, a distance from the Y-image leading edge position 200Y to the primary transfer position of the photosensitive drum 100M is equal to $L_M$. The C-image and K-image leading edge positions do not exist because the associated photosensitive drums are not exposed yet at this time.

FIG. 25C shows a state in which the Y-image leading edge position 200Y has reached the primary transfer position of the photosensitive drum 100M. In this state, the Y-image leading edge position 200Y and the M-image leading edge position 200M have reached the primary transfer position of the photosensitive drum 100M at the same time, and the leading edge positions of the Y-image and the M-image are accurately aligned with each other.

Note that a timing for exposing the C-image leading edge and a timing for exposing the K-image leading edge are determined by the respective target distances $TD_C$ and $TD_K$, described hereinabove, similarly to the timing for exposing the M-image leading edge.

Although in FIGS. 25A to 25C, the case where the values of $D_{YM}$, $D_{MC}$, and $D_{YK}$ are larger than the values of $L_M$, $L_C$, and $L_K$, respectively, has been described, even in a different case from the above-described case, by performing the image formation operation based on the values calculated from the equations (16), (17), and (18), it is possible to accurately align the image leading edge positions.

By executing the above-described operation, the image writing positions in the sub scanning direction of the respective colors coincide with each other on the intermediate transfer member 108, and further, as described in the exposure control, the image writing position interval in the sub scanning direction of each color is always constant even when speed variation of each of the photosensitive drums 100 is caused.

As a result, it is possible to prevent occurrence of color shift in the images transferred onto the intermediate transfer member 108, which suppresses occurrence of color shift in the resulting image transferred onto a recording sheet. To improve the positional accuracy, it is preferable to select a rotary encoder which is higher in resolution.

Figure 26:
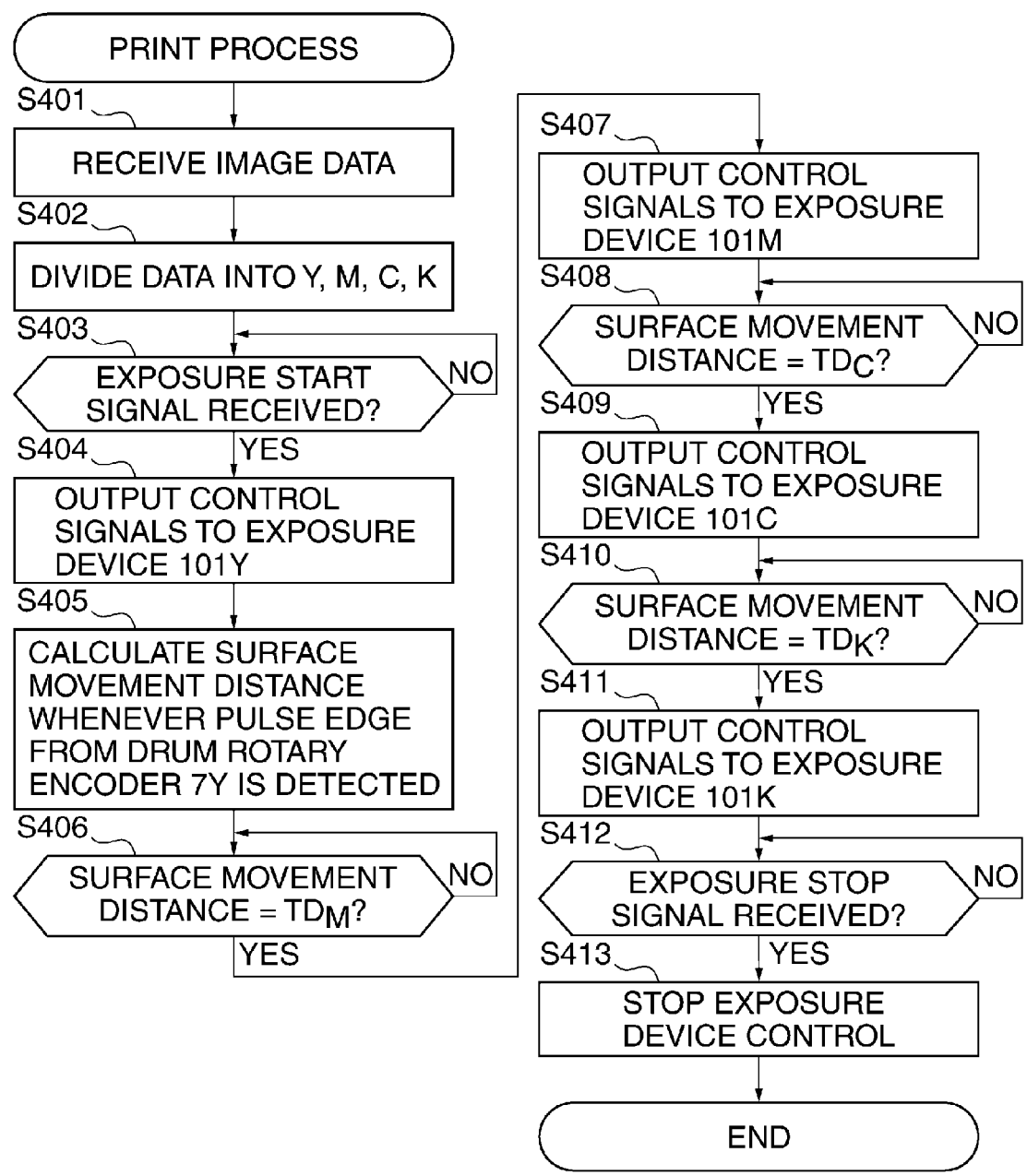
FIG. 26 is a flowchart of a print process executed by a CPU of a control unit of the image forming apparatus according to the second embodiment.

FIG. 26 is a flowchart of a print process executed by the CPU 13 of the control unit 2 of the image forming apparatus according to the second embodiment.

Referring to FIG. 26, when the controller 60 receives a print operation command, the controller 60 outputs a command signal for starting various process control to the host CPU 1. At the same time, image data is input from the controller 60 to the control unit 2 (step S401).

The CPU 13 divides the image data into information items of the respective colors Y, M, C, and K for controlling the exposure devices 101 (step S402).

When the CPU 13 receives an exposure start signal from the host CPU 1 (YES to a step S403), the CPU 13 outputs a CLK signal and a PWM signal to the exposure device 101Y as control signals (step S404). The subsequent sub scanning exposure timing is determined according to the sub scanning exposure timing interval Δt.

Then, whenever a pulse edge of the signal from the drum rotary encoder 7Y is detected, the CPU 13 adds an associated surface distance on the photosensitive drum 100Y to thereby calculate a surface movement distance (step S405).

When the surface movement distance calculated by adding up surface distances becomes equal to the target distance $TD_M$ calculated by the equation (16) (YES to a step S406), the CPU 13 outputs a CLK signal and a PWM signal to the exposure device 101M as control signals (step S407). The subsequent sub scanning exposure timing is determined according to the sub scanning exposure timing interval Δt.

When the surface movement distance becomes equal to the target distance $TD_C$ calculated by the equation (17) (YES to a step S408), the CPU 13 outputs a CLK signal and a PWM signal to the exposure device 101C as control signals (step S409). The subsequent sub scanning exposure timing is determined according to the sub scanning exposure timing interval Δt.

When the surface movement distance becomes equal to the target distance $TD_K$ calculated by the equation (18) (YES to a step S410), the CPU 13 outputs a CLK signal and a PWM signal to the exposure device 101K as control signals (step S411). The subsequent sub scanning exposure timing is determined according to the sub scanning exposure timing interval Δt.

When the CPU 13 receives an exposure stop signal from the host CPU 1 (YES to a step S412), the CPU 13 stops the control for the exposure devices 101 (step S413), followed by terminating the present process. According to the above-described process, it is possible to transfer the images onto the intermediate transfer member 108 without occurrence of color shift.

Next, a description will be given of a third embodiment of the present invention. The present embodiment has the same hardware configuration as that of the first embodiment, and hence component elements corresponding to those in the first embodiment are denoted by the same reference numerals, and description thereof is omitted, while only different points from the first embodiment and the second embodiment will be described hereafter. In the second embodiment, the distance information for controlling the exposure timing for exposing the drums of the respective colors is calculated using only the drum rotary encoder 7Y disposed on the photosensitive drum 100Y. On the other hand, in the third embodiment, the exposure timing is controlled by using count values from the drum rotary encoder 7Y and the intermediate transfer member rotary encoder 87 mounted on the intermediate transfer member 108.

This is because a case is expected where even when the friction driving is performed, timings of detection by the photosensitive drums 100 and the intermediate transfer member rotary encoder 87 do not completely coincide with each other due to differences in friction coefficient between the photosensitive drums 100 and the intermediate transfer member 108, differences in load between the photosensitive drums 100, and differences in the amount of assist torque set for each photosensitive drum.

To cope with this, by using the Y-image as a reference image, the timings of exposure light irradiation of the respective colors are caused to be made uniform according to respective distances over which the reference image is moved. More specifically, before the leading edge of the Y-image is transferred onto the intermediate transfer member 108, the distance detected by the drum rotary encoder 7Y is counted, and thereafter, the distance detected by the intermediate transfer member rotary encoder 87 is counted.

First, the exposure start target distances $TD'_Y$, $TD'_M$, $TD'_C$, and $TD'_K$ are calculated by the following equations (19), (20), (21), and (22):

$$TD'_Y = L_Y = \sum_{n=w_y}^{w_y+S} Z_{Yn} \quad (19)$$

$$TD'_M = D_{YM} - L_M = D_{YM} - \sum_{n=w_m}^{w_m+S} Z_{Mn} \quad (20)$$

$$TD'_C = D_{YC} - L_C = D_{YC} - \sum_{n=w_c}^{w_c+S} Z_{Cn} \quad (21)$$

$$TD'_K = D_{YK} - L_K = D_{YK} - \sum_{n=w_k}^{w_k+S} Z_{Kn} \quad (22)$$

Symbols in the above equations represent the following:

n: encoder pulse number assigned to each slit for identification of the slit s: the number of slits corresponding to an angle formed between circumferential positions of the drum rotary encoder respectively corresponding to the exposure light irradiated position and the primary transfer position of the photosensitive drum $w_y$: encoder pulse number associated with the photosensitive drum 100Y at a time when the exposure device 101Y starts exposure $w_m$: encoder pulse number associated with the photosensitive drum 100M at a certain timing $w_c$: encoder pulse number associated with the photosensitive drum 100C at a certain timing $w_k$: encoder pulse number associated with the photosensitive drum 100K at a certain timing $Z_{Yn}$: surface distance on the photosensitive drum 100Y associated with a slit n of the drum rotary encoder 7Y

$Z_{Mn}$: surface distance on the photosensitive drum 100M associated with a slit n of the drum rotary encoder 7M

$Z_{Cn}$: surface distance on the photosensitive drum 100C associated with a slit n of the drum rotary encoder 7C

$Z_{Kn}$: surface distance on the photosensitive drum 100K associated with a slit n of the drum rotary encoder 7K

$L_Y$: surface distance from the exposure light irradiated position to the primary transfer position of the photosensitive drum 100Y

$L_M$: surface distance from the exposure light irradiated position to the primary transfer position of the photosensitive drum 100M

$L_C$: surface distance from the exposure light irradiated position to the primary transfer position of the photosensitive drum 100C

$L_K$: surface distance from the exposure light irradiated position to the primary transfer position of the photosensitive drum 100K

$D_{YM}$: distance between the primary transfer positions of the photosensitive drums 100Y and 100M

$D_{YC}$: distance between the primary transfer positions of the photosensitive drums 100Y and 100C

$D_{YK}$: distance between the primary transfer positions of the photosensitive drums 100Y and 100K

The values of $Z_{Yn}$, $Z_{Mn}$, $Z_{Cn}$, $Z_{Kn}$, $D_{YM}$, $D_{YC}$, and $D_{YK}$ are stored in the ROM 14 in advance. The value of $L_Y$ is calculated by the CPU 13 when the image formation start signal is received, and the values of $L_M$, $L_C$, $L_K$, $TD'_M$, $TD'_C$, and $TD'_K$ are calculated by the CPU 13 whenever an encoder pulse edge is input. Image formation is performed using the calculated target distances $TD'_Y$, $TD'_M$, $TD'_C$, and $TD'_K$.

As described above, the equations (20), (21), and (22) in the third embodiment are formed by excluding the third term, i.e. the summation ($\Sigma$) of $Z_{Yp}$, in the right side of each of the equations (16), (17), and (18) in the second embodiment.

In other words, in the third embodiment, in place of the target distances used in the second embodiment, the target distances $TD'_M$, $TD'_C$, and $TD'_K$ are calculated by subtracting the respective second surface distances from the distances from the primary transfer position of the photosensitive drum 100Y where the photosensitive drum 100Y is in contact with the intermediate transfer member 108 to the respective primary transfer positions of the photosensitive drums 100M, 100C, and 100K where the photosensitive drums 100M, 100C, and 100K are in contact with the intermediate transfer member 108.

Then, the CPU 13 controls the exposure devices 101M, 101C, and 101K to expose the photosensitive drums 100M, 100C, and 100K, respectively, when the surface movement distance of the intermediate transfer member 108, calculated using pulses output from the intermediate transfer member rotary encoder 87, becomes equal to the respective target distances, respectively.

Figure 27:
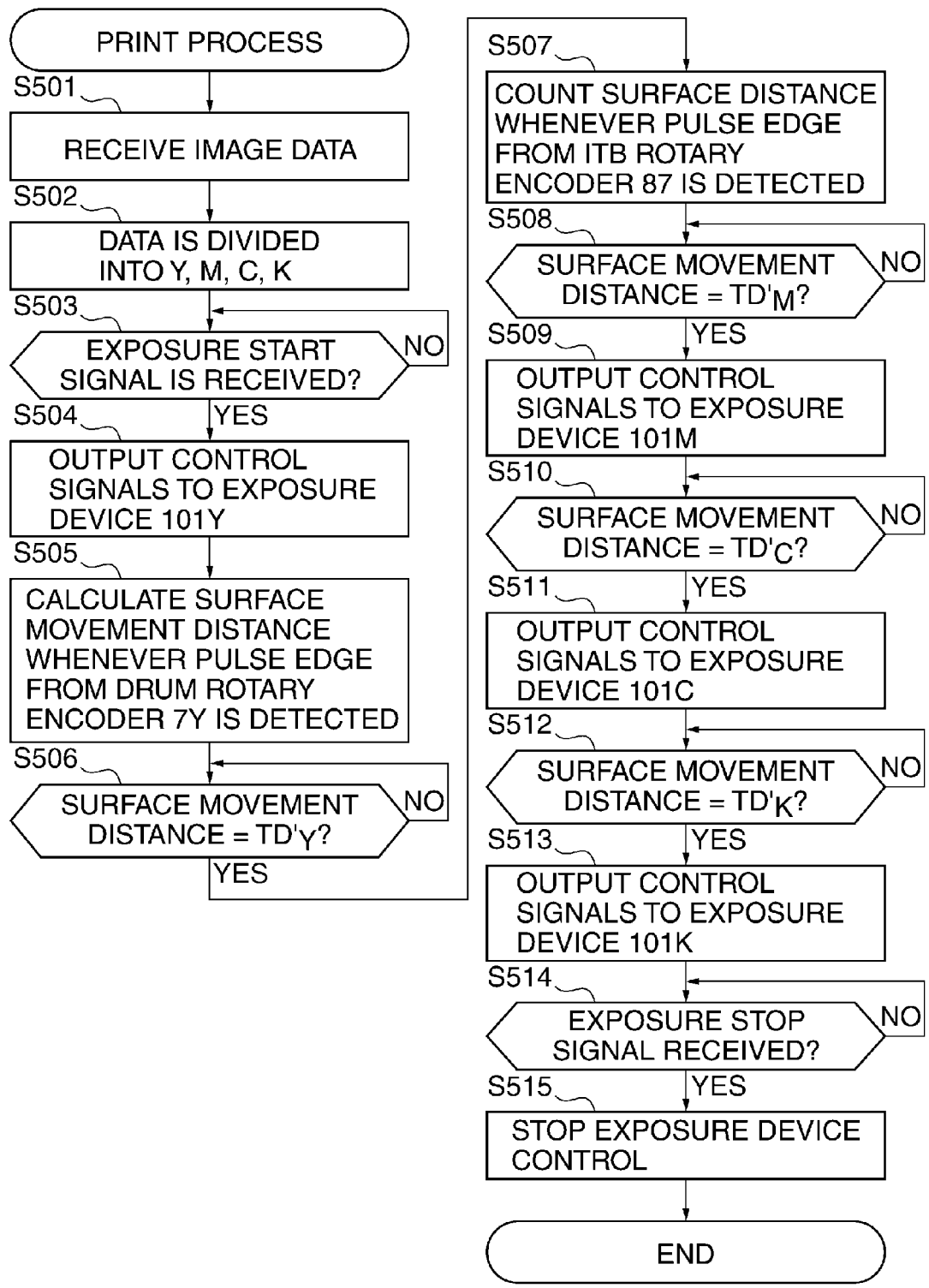
FIG. 27 is a flowchart of a print process executed by a CPU of a control unit of an image forming apparatus according to a third embodiment of the present invention.

FIG. 27 is a flowchart of a print process executed by the CPU 13 of the control unit 2 of the image forming apparatus according to the third embodiment.

Referring to FIG. 27, when the controller 60 receives a print operation command, the controller 60 outputs a command signal for starting various process controls to the host CPU 1. At the same time, image data is input from the controller 60 to the control unit 2 (step S501).

The CPU 13 divides the image data into information items of the respective colors Y, M, C, and K for controlling the exposure devices 101 (step S502).

When the CPU 13 receives an exposure start signal from the host CPU 1 (YES to a step S503), the CPU 13 outputs a CLK signal and a PWM signal to the exposure device 101Y as control signals (step S504). The subsequent sub scanning exposure timing is determined according to the sub scanning exposure timing interval $\Delta t$.

Then, whenever a pulse edge of the signal from the drum rotary encoder 7Y is detected, the CPU 13 adds an associated surface distance on the photosensitive drum 100Y to thereby calculate a surface movement distance (step S505).

When the surface movement distance calculated by adding up surface distances becomes equal to the target distance $TD'_Y$ calculated by the equation (19) (YES to a step S506), the CPU 13 starts to add an associated surface distance whenever a pulse edge of the signal from the intermediate transfer member rotary encoder 87 is detected, to thereby newly start to calculate a surface movement distance (step S507).

When the surface movement distance calculated based on detection of a pulse edge of the signal from the intermediate transfer member rotary encoder 87 becomes equal to the target distance $TD'_M$ calculated by the equation (20) (YES to a step S508), the CPU 13 outputs a CLK signal and a PWM signal to the exposure device 101M as control signals (step S509). The subsequent sub scanning exposure is determined according to the sub scanning exposure timing interval $\Delta t$.

When the calculated surface movement distance becomes equal to the target distance $TD'_C$ calculated by the equation (21) (YES to a step S510), the CPU 13 outputs a CLK signal and a PWM signal to the exposure device 101C as control signals (step S511). The subsequent sub scanning exposure is determined according to the sub scanning exposure timing interval $\Delta t$.

When the calculated surface movement distance becomes equal to the target distance $TD'_K$ calculated by the equation (22) (YES to a step S512), the CPU 13 outputs a CLK signal and a PWM signal to the exposure device 101K as control signals (step S513). The subsequent sub scanning exposure is determined according to the sub scanning exposure timing interval $\Delta t$.

When the CPU 13 receives an exposure stop signal from the host CPU 1 (YES to a step S514), the CPU 13 stops the control for the exposure devices 101 (step S515), followed by terminating the present process. According to the above-described process, it is possible to transfer images from the photosensitive drums 100 onto the intermediate transfer member 108 without color shift.

The present embodiment thus employs the method of controlling the start timing for exposing each photosensitive drum, based on the distance from the exposure light irradiated position to the primary transfer position of each photosensitive drum and the distance between the primary transfer positions of the photosensitive drums. As a consequence, in the present embodiment, it is possible to prevent occurrence of color shift in the images transferred from the plurality of image bearing members (photosensitive drums) onto the intermediate transfer member, and it is possible to suppress color shift in a image transferred onto a recording sheet.

As described hereinabove, in the second embodiment, first, the first surface distance from the exposure light irradiated position of the photosensitive drum 100Y where exposure by the exposure device 101Y is performed to the primary transfer position of the photosensitive drum 100Y where the photosensitive drum 100Y is in contact with the intermediate transfer member 108 is added to the respective distances from the primary transfer position of the photosensitive drum 100Y to the respective primary transfer positions of the photosensitive drums 100M, 100C, and 100K whereby the photosensitive drums 100M, 100C, and 100K are in contact with the intermediate transfer member 108, to thereby calculate respective sums.

From the thus calculated sums, the second surface distances at a time point at which the photosensitive drum 100Y is exposed by the exposure device 101Y, extending from the exposure light irradiated positions of the photosensitive drums 100M, 100C, and 100K, which exposure is performed by the exposure devices 101M, 101C, and 101K, respectively, to the primary transfer positions of the photosensitive drums 100M, 100C, and 100K where the photosensitive drums 100M, 100C, and 100K are in contact with the intermediate transfer member 108, are subtracted, respectively, to thereby calculate the target distances, respectively.

Then, the CPU 13 controls the exposure devices 101M, 101C, and 101K to expose the respective photosensitive drums 100M, 100C, and 100K at respective times when the surface movement distance from the exposure light irradiated position of the photosensitive drum 100Y, where exposure is started by the exposure device 101Y, becomes equal to the calculated target distances, respectively.

In the third embodiment, target distances are calculated, without adding the first surface distance, by subtracting the respective second surface distances from the distances from the primary transfer position of the photosensitive drum 100Y where the photosensitive drum 100Y is in contact with the intermediate transfer member 108 to the primary transfer positions of the photosensitive drums 100M, 100C, and 100K where the photosensitive drums 100M, 100C, and 100K are in contact with the intermediate transfer member 108, respectively. Then, the exposure devices 101M, 101C, and 101K are caused to start exposure at respective timings in which the surface movement distance started to be calculated from a time point that an image on the photosensitive drum 100Y has reached the primary transfer position reach the calculated target distances, respectively.

Thus, the present invention can provide an image forming apparatus which suppresses occurrence of color shift of images transferred from a plurality of image bearing members onto an intermediate transfer member.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-275680, filed Dec. 18, 2012, and No. 2013-159385, filed Jul. 31, 2013 which are hereby incorporated by reference herein in their entirety.

What is claimed is:

1. An image forming apparatus comprising:
    a first image bearing member and a second image bearing member, a surface of each of which is adapted to be charged;
    an exposure unit provided for each of said first and second image bearing members and configured to form an electrostatic latent image by exposing each associated one of said first and second image bearing members, the surface of which having been charged;
    a developing unit provided for each of said first and second image bearing members and configured to develop the electrostatic latent image with color material;
    an intermediate transfer member configured to be brought into contact with said first and second image bearing members, and have the color material transferred thereon, with which the electrostatic latent image on each of said first and second image bearing members has been developed by said developing unit;
    a control unit configured to control timing for exposing said second image bearing member in dependence upon a first surface distance from a position on said first image bearing member where exposure is started by said exposure unit to a position where said first image bearing member is in contact with said intermediate transfer member, and a second surface distance at a time when said first image bearing member is exposed by said exposure unit, extending from a position on said second image bearing member, which is to be exposed by said exposure unit, to a position where said second image bearing member is in contact with said intermediate transfer member;

a first calculation unit configured to calculate the first surface distance;

a second calculation unit configured to calculate the second surface distance;

a target value calculation unit configured to calculate a target value by adding the first surface distance calculated by said first calculation unit to a distance between a position where said first image bearing member is in contact with said intermediate transfer member and a position where said second image bearing member is in contact with said intermediate transfer member, and further subtracting the second surface distance calculated by said second calculation unit from a result of said adding; and an intermediate transfer member rotary encoder configured to use a rotational shaft of a rotating member that drives said intermediate transfer member, as an input shaft, wherein said control unit controls said exposure unit to start to expose said second image bearing member at a time when a distance over which a point on the surface of said first image bearing member has moved from the position where exposure is started by said exposure unit, becomes equal to the target value calculated by said target value calculation unit, wherein said target value calculation unit calculates a second target value, by subtracting the second surface distance calculated by said second calculation unit from a distance from the position where said first image bearing member is in contact with said intermediate transfer member to the position where said second image bearing member is in contact with said intermediate transfer member, and wherein said control unit controls said exposure unit to expose said second image bearing member at a time when the distance over which a point the surface of said intermediate transfer member has moved, calculated using a pulse output from said intermediate transfer member rotary encoder, becomes equal to the second target value calculated by said target value calculation unit.

2. The image forming apparatus according to claim 1, wherein timing for exposing said second image bearing member is further controlled in dependence upon a distance between a position where said first image bearing member is in contact with said intermediate transfer member and a position where said second image bearing member is in contact with said intermediate transfer member.

3. The image forming apparatus according to claim 2, further comprising a first calculation unit configured to calculate the first surface distance;

a second calculation unit configured to calculate the second surface distance; and a target value calculation unit configured to calculate a target value by adding the first surface distance calculated by said first calculation unit to a distance between a position where said first image bearing member is in contact with said intermediate transfer member and a position where said second image bearing member is in contact with said intermediate transfer member, and further subtracting the second surface distance calculated by said second calculation unit from a result of said adding, and wherein said control unit controls said exposure unit to start to expose said second image bearing member at a time when a distance over which a point on the surface of said first image bearing member has moved from the position where exposure is started by said exposure unit, becomes equal to the target value calculated by said target value calculation unit.

4. The image forming apparatus according to claim 3, further comprising an image bearing member rotary encoder provided for each of said first and second image bearing members, and configured to use a rotational shaft of an associated one of said first and second image bearing members as an input shaft; and a storage unit configured to store a pulse-associated surface distance over which each of said first and second image bearing members moves whenever a pulse output from said image bearing member rotary encoder is input, in association with each pulse, and wherein whenever the pulse is input, each of said first calculation unit and said second calculation unit adds the pulse-associated surface distance stored in said storage unit to thereby calculate the first surface distance and the second surface distance, respectively.

5. The image forming apparatus according to claim 1, further comprising an image bearing member rotary encoder provided for each of said first and second image bearing members, and configured to use a rotational shaft of an associated one of said first and second image bearing members as an input shaft; and a storage unit configured to store a pulse-associated surface distance over which each of said first and second image bearing members moves whenever a pulse output from said image bearing member rotary encoder is input, in association with each pulse, and wherein whenever the pulse is input, each of said first calculation unit and said second calculation unit adds the pulse-associated surface distance stored in said storage unit to thereby calculate the first surface distance and the second surface distance, respectively.

6. An image forming apparatus comprising:

a first image bearing member and a second image bearing member, a surface of each of which is adapted to be charged;

an exposure unit provided for each of said first and second image bearing members and configured to form an electrostatic latent image by exposing each associated one of said first and second image bearing members, the surface of which having been charged;

a developing unit provided for each of said first and second image bearing members and configured to develop the electrostatic latent image with color material;

an intermediate transfer member configured to be brought into contact with said first and second image bearing members, and have the color material transferred thereon, with which the electrostatic latent image on each of said first and second image bearing members has been developed by said developing unit;

a control unit configured to control timing for exposing said second image bearing member in dependence upon a first surface distance from a position on said first image bearing member where exposure is started by said exposure unit to a position where said first image bearing member is in contact with said intermediate transfer member, and a second surface distance at a time when said first image bearing member is exposed by said exposure unit, extending from a position on said second image bearing member, which is to be exposed by said exposure unit, to a position where said second image bearing member is in contact with said intermediate transfer member, wherein timing for exposing said second image bearing member is further controlled in dependence upon a distance between a position where said first image bearing member is in contact with said intermediate transfer member and a position where said second image bearing member is in contact with said intermediate transfer member;

the image forming apparatus further comprising:

a first calculation unit configured to calculate the first surface distance;

a second calculation unit configured to calculate the second surface distance; and a target value calculation unit configured to calculate a target value by adding the first surface distance calculated by said first calculation unit to a distance between a position where said first image bearing member is in contact with said intermediate transfer member and a position where said second image bearing member is in contact with said intermediate transfer member, and further subtracting the second surface distance calculated by said second calculation unit from a result of said adding, and wherein said control unit controls said exposure unit to start to expose said second image bearing member at a time when a distance over which a point on the surface of said first image bearing member has moved from the position where exposure is started by said exposure unit, becomes equal to the target value calculated by said target value calculation unit;

the image forming apparatus, further comprising:

an intermediate transfer member rotary encoder configured to use a rotational shaft of a rotating member that drives said intermediate transfer member, as an input shaft, and wherein said target value calculation unit calculates a second target value, by subtracting the second surface distance calculated by said second calculation unit from a distance from the position where said first image bearing member is in contact with said intermediate transfer member to the position where said second image bearing member is in contact with said intermediate transfer member, and wherein said control unit controls said exposure unit to expose said second image bearing member at a time when the distance over which a point the surface of said intermediate transfer member has moved, calculated using a pulse output from said intermediate transfer member rotary encoder, becomes equal to the second target value calculated by said target value calculation unit.

7. An image forming apparatus comprising:

a plurality of image bearing members, a surface of each of which is charged;

an exposure unit provided for each of said plurality of image bearing members and configured to form an electrostatic latent image by exposing each associated one of said plurality of image bearing members, the surface of which has been charged;

a developing unit provided for each of said plurality of image bearing members and configured to develop the electrostatic latent image with color material;

an image bearing member rotary encoder provided for each of said plurality of image bearing members and configured to use a rotational shaft of an associated one of said image bearing members as an input shaft;

an intermediate transfer member configured to be brought into contact with said plurality of image bearing members to friction-drive said image bearing members for rotation, and have the color material transferred thereon from each said image bearing member, with which the electrostatic latent image on each said image bearing member has been developed by said developing unit;

an intermediate transfer member rotary encoder configured to use a rotational shaft of a rotating member that drives said intermediate transfer member, as an input shaft;

a count unit configured to count pulses output from said image bearing member rotary encoder and said intermediate transfer member rotary encoder; and a control unit configured to control timing at which each said exposure unit exposes an associated one of said image bearing members, in dependence upon a first distance from a position where each said image bearing member is exposed by said exposure unit to a position where an image is transferred onto said intermediate transfer member, a second distance between a position where the image is transferred from one of said image bearing members as a reference image bearing member to said intermediate transfer member and a position where the image is transferred from each of said image bearing members other than the reference image bearing member to said intermediate transfer member, and the number of pulses counted by said count unit.

8. The image forming apparatus according to claim 7, further comprising a storage unit configured to store a first target value which is a value calculated by multiplying the first distance of said reference image bearing member by the number of pulses to be output from said image bearing member rotary encoder for one revolution, and dividing the resulting multiplication product by a circumference of said image bearing member, and wherein a timing at which said count unit starts to count the pulses output from said intermediate transfer member rotary encoder is a timing at which the number of pulses output from said image bearing member rotary encoder, counted by said count unit, becomes equal to the first target value.

9. The image forming apparatus according to claim 8, wherein said storage unit stores in advance a second target value calculated by subtracting a value calculated by multiplying the first distance by the number of pulses to be output from said image bearing member rotary encoder for one revolution and dividing the resulting multiplication product by a circumference of each associated image bearing member other than the reference image bearing member, from a value calculated by multiplying the second distance by the number of pulses to be output from said intermediate transfer member rotary encoder for one revolution and dividing the resulting multiplication product by a circumference of said rotating member, and wherein a timing at which said exposure unit associated with each of said image bearing members other than said reference image bearing member starts to expose said associated image bearing member is a timing at which the number of pulses output from said intermediate transfer member rotary encoder, counted by said count unit, becomes equal to the second target value.

10. The image forming apparatus according to claim 7, further comprising a storage unit configured to store in advance a first physical amount for determining a surface movement distance of each image bearing member associated with each pulse to be output from said image bearing member rotary encoder, and wherein a timing at which said count unit starts to count the pulses output from said intermediate transfer member rotary encoder is a timing at which a value calculated, whenever said image bearing member rotary encoder associated with said reference image bearing member outputs a pulse, by multiplying the first physical amount associated with the output pulse by a circumference ratio, dividing the resulting multiplication product by the number of pluses to be output from said image bearing member rotary encoder for one revolution, and subtracting the value thus calculated from the first distance of said reference image bearing member, becomes equal to 0.

11. The image forming apparatus according to claim 7, further comprising a storage unit configured to store in advance a second physical amount for determining a surface movement distance of said intermediate transfer member, associated with each pulse to be output from said intermediate transfer member rotary encoder, and wherein a timing at which said exposure unit associated with each of said image bearing members other than said reference image bearing member starts to expose said associated image bearing member is a timing at which a value calculated by subtracting, from the second distance, a value calculated by multiplying a sum of the first physical amounts by a circumference ratio and dividing the resulting multiplication product by the number of pulses to be output from said image bearing rotary encoder for one revolution, and further subtracting a value calculated, whenever said intermediate transfer member rotary encoder outputs a pulse, by multiplying the second physical amount associated with the output pulse by a circumference ratio, and dividing the resulting multiplication product by the number of pluses to be output from said intermediate transfer member rotary encoder for one revolution, becomes equal to 0.

12. A method of controlling an image forming apparatus comprising:

a first image bearing member and a second image bearing member, a surface of each of which is adapted to be charged;

an exposure unit provided for each of said first and second image bearing members and configured to form an electrostatic latent image by exposing each associated one of said first and second image bearing members, the surface of which having been charged;

a developing unit provided for each of said first and second image bearing members and configured to develop the electrostatic latent image with color material;

an intermediate transfer member configured to be brought into contact with said first and second image bearing members, and have the color material transferred thereon, with which the electrostatic latent image on each of said first and second image bearing members has been developed by said developing unit, and an intermediate transfer member rotary encoder configured to use a rotational shaft of a rotating member that drives said intermediate transfer member, as an input shaft, the method comprising controlling timing for exposing said second image bearing member in dependence upon a first surface distance from a position on said first image bearing member where exposure is started by said exposure unit to a position where said first image bearing member is in contact with said intermediate transfer member, and a second surface distance at a time when said first image bearing member is exposed by said exposure unit, extending from a position on said second image bearing member, which is to be exposed by said exposure unit, to a position where said second image bearing member is in contact with said intermediate transfer member, calculating a target value by adding the first surface distance to a distance between a position where said first image bearing member is in contact with said intermediate transfer member and a position where said second image bearing member is in contact with said intermediate transfer member, and further subtracting the second surface distance from a result of said adding, controlling said exposure unit to start to expose said second image bearing member at a time when a distance over which a point on the surface of said first image bearing member has moved from the position where exposure is started by said exposure unit, becomes equal to the calculated target value, calculating a second target value, by subtracting the second surface distance from a distance from the position where said first image bearing member is in contact with said intermediate transfer member to the position where said second image bearing member is in contact with said intermediate transfer member, and controlling said exposure unit to expose said second image bearing member at a time when the distance over which a point the surface of said intermediate transfer member has moved, calculated using a pulse output from said intermediate transfer member rotary encoder, becomes equal to the calculated second target value.

13. A method of controlling an image forming apparatus comprising:

a plurality of image bearing members, a surface of each of which is charged;

an exposure unit provided for each of said plurality of image bearing members and configured to form an electrostatic latent image by exposing each associated one of said plurality of image bearing members, the surface of which has been charged;

a developing unit provided for each of said plurality of image bearing members and configured to develop the electrostatic latent image with color material;

an image bearing member rotary encoder provided for each of said plurality of image bearing members and configured to use a rotational shaft of an associated one of said image bearing members as an input shaft;

an intermediate transfer member configured to be brought into contact with said plurality of image bearing members to friction-drive said image bearing members for rotation, and have the color material transferred thereon from each said image bearing member, with which the electrostatic latent image on each said image bearing member has been developed by said developing unit;

an intermediate transfer member rotary encoder configured to use a rotational shaft of a rotating member that drives said intermediate transfer member, as an input shaft; and a count unit configured to count pulses output from said image bearing member rotary encoder and said intermediate transfer member rotary encoder, the method comprising controlling timing at which each said exposure unit exposes an associated one of said image bearing members, in dependence upon a first distance from a position where each said image bearing member is exposed by said exposure unit to a position where an image is transferred onto said intermediate transfer member, a second distance between a position where the image is transferred from one of said image bearing members as a reference image bearing member to said intermediate transfer member and a position where the image is transferred from each of said image bearing members other than the reference image bearing member to said intermediate transfer member, and the number of pulses counted by said count unit.

* * * * *